US012578824B2

(12) United States Patent
Kim

(10) Patent No.: US 12,578,824 B2
(45) Date of Patent: Mar. 17, 2026

(54) PROJECTOR AND METHOD FOR CONTROLLING THE SAME

(71) Applicant: Samsung Electronics Co., Ltd., Suwon-si (KR)

(72) Inventor: Hyungchul Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/583,270

(22) Filed: Feb. 21, 2024

(65) Prior Publication Data

US 2024/0295939 A1     Sep. 5, 2024

Related U.S. Application Data

(63) Continuation of application No. PCT/KR2024/001671, filed on Feb. 5, 2024.

(30) Foreign Application Priority Data

Mar. 2, 2023     (KR) ......................... 10-2023-0027933

(51) Int. Cl.
*G06F 3/042* (2006.01)
*G06F 3/01* (2006.01)
(Continued)

(52) U.S. Cl.
CPC ............ *G06F 3/0425* (2013.01); *G06F 3/017* (2013.01); *G06F 3/03545* (2013.01);
(Continued)

(58) Field of Classification Search
CPC .... G06F 3/0425; G06F 3/017; G06F 3/03545; G06F 3/0386; G06F 3/0418; G06V 40/1318
(Continued)

(56) References Cited

U.S. PATENT DOCUMENTS 9,552,072 B2     1/2017  Yamamoto et al.
9,942,529 B2     4/2018  Yamamoto et al.
(Continued)

FOREIGN PATENT DOCUMENTS

CN      115357120 A     11/2022
JP      2008-287142     11/2008
(Continued)

OTHER PUBLICATIONS

International Search Report dated May 2, 2024 for PCT Patent Application No. PCT/KR2024/001671.
(Continued)

*Primary Examiner* — Mark Edwards
(74) *Attorney, Agent, or Firm* — STAAS & HALSEY LLP

(57) ABSTRACT

A projector including at least one sensor; a memory storing one or more instructions; and at least one processor to execute the instructions to detect a projection direction of the projector, when the detected projection direction is toward a surface on which the projector is placed, detect a touch input on a projection surface to which the projector projects an image, recognize the touch input as a user input, and perform an operation corresponding to the touch input recognized as the user input, and when the detected projection direction is toward a surface perpendicular to the surface on which the projector is placed, detect a gesture input of a user in a sensing area formed in an opposite direction of the projection surface with respect to the projector, recognize the gesture input as a user input, and perform an operation corresponding to the gesture input recognized as the user input.

20 Claims, 15 Drawing Sheets

(51) Int. Cl.
    *G06F 3/0354*     (2013.01)
    *G06F 3/038*     (2013.01)
    *G06F 3/041*     (2006.01)
    *G06V 40/13*     (2022.01)

(52) U.S. Cl.
    CPC .......... *G06F 3/0386* (2013.01); *G06F 3/0418* (2013.01); *G06V 40/1318* (2022.01)

(58) Field of Classification Search
    USPC ......................................................... 345/175
    See application file for complete search history.

(56) References Cited

U.S. PATENT DOCUMENTS

| | | | |
|---|---|---|---|
| 10,429,939 B2 | 10/2019 | Kim et al. | |
| 10,939,091 B1 | 3/2021 | Choi et al. | |
| 10,955,960 B2 | 3/2021 | Saito et al. | |
| 2003/0122780 A1* | 7/2003 | Hendriks | G06F 3/03542 |
| | | | 345/156 |
| 2008/0042999 A1* | 2/2008 | Martin | H04L 12/1822 |
| | | | 345/178 |
| 2012/0044141 A1* | 2/2012 | Ueshima | A63F 13/5372 |
| | | | 345/158 |
| 2015/0185859 A1 | 7/2015 | Yamamoto et al. | |
| 2016/0316113 A1 | 10/2016 | Zannier et al. | |
| 2016/0316184 A1 | 10/2016 | Kim et al. | |
| 2017/0131790 A1 | 5/2017 | Sung et al. | |
| 2017/0244943 A1* | 8/2017 | Saito | G06F 3/04842 |

FOREIGN PATENT DOCUMENTS

| | | |
|---|---|---|
| JP | 2015-125670 | 7/2015 |
| JP | 2016-197768 | 11/2016 |
| JP | 6134804 | 5/2017 |
| JP | 2021-51760 | 4/2021 |
| KR | 10-0649623 B1 | 11/2006 |
| KR | 10-0942431 B1 | 2/2010 |
| KR | 10-1536673 B1 | 7/2015 |
| KR | 10-2016-0025929 A | 3/2016 |
| KR | 10-2016-0125853 | 11/2016 |
| KR | 10-2021-0100958 A | 8/2021 |

OTHER PUBLICATIONS

Extended European Search Report dated Feb. 2, 2026 for European Application No. 24764104.6.

* cited by examiner

FIG. 7

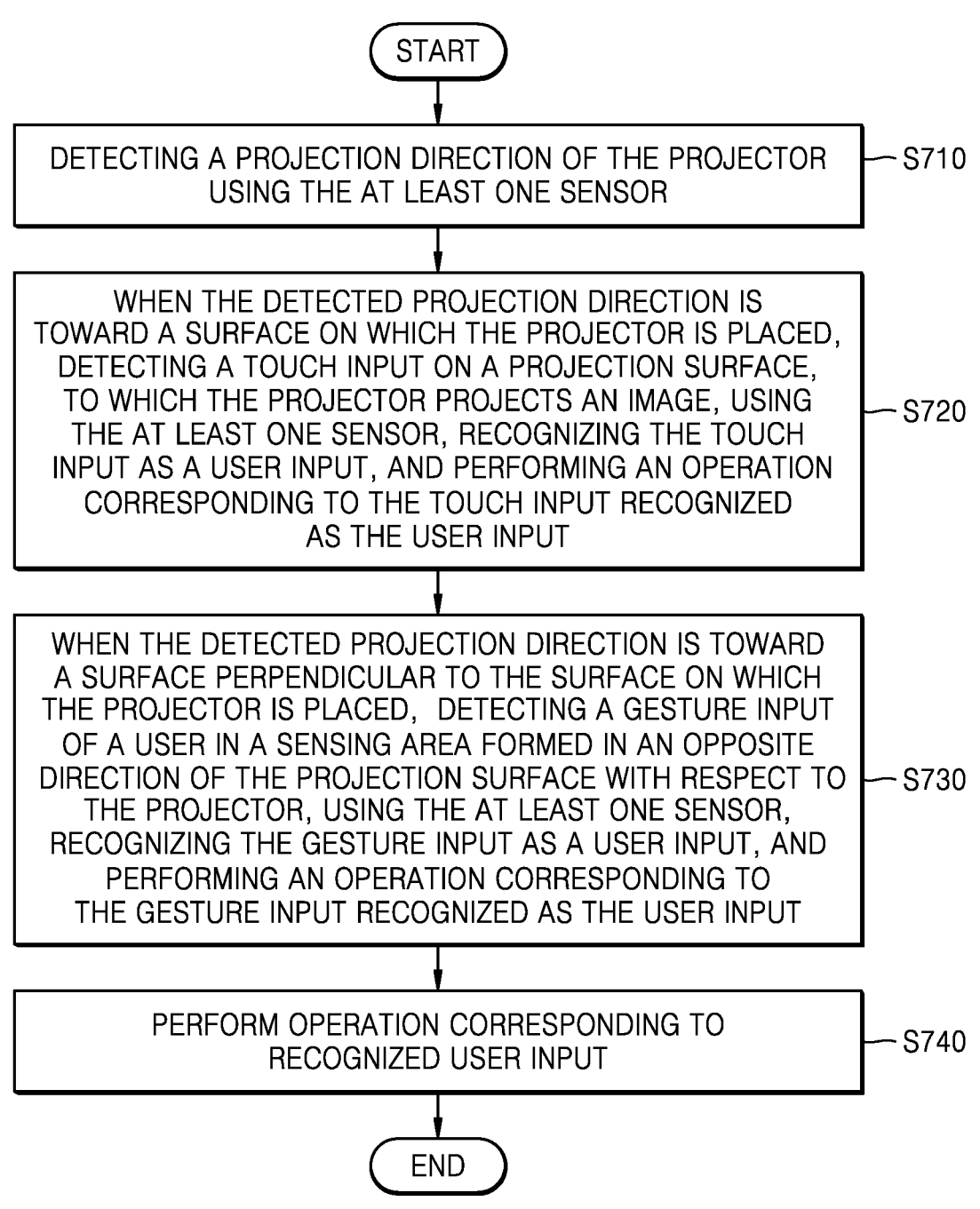

START

DETECTING A PROJECTION DIRECTION OF THE PROJECTOR
USING THE AT LEAST ONE SENSOR — S710

WHEN THE DETECTED PROJECTION DIRECTION IS
TOWARD A SURFACE ON WHICH THE PROJECTOR IS PLACED,
DETECTING A TOUCH INPUT ON A PROJECTION SURFACE,
TO WHICH THE PROJECTOR PROJECTS AN IMAGE, USING
THE AT LEAST ONE SENSOR, RECOGNIZING THE TOUCH
INPUT AS A USER INPUT, AND PERFORMING AN OPERATION
CORRESPONDING TO THE TOUCH INPUT RECOGNIZED
AS THE USER INPUT — S720

WHEN THE DETECTED PROJECTION DIRECTION IS TOWARD
A SURFACE PERPENDICULAR TO THE SURFACE ON WHICH
THE PROJECTOR IS PLACED,  DETECTING A GESTURE INPUT
OF A USER IN A SENSING AREA FORMED IN AN OPPOSITE
DIRECTION OF THE PROJECTION SURFACE WITH RESPECT TO
THE PROJECTOR, USING THE AT LEAST ONE SENSOR,
RECOGNIZING THE GESTURE INPUT AS A USER INPUT, AND
PERFORMING AN OPERATION CORRESPONDING TO
THE GESTURE INPUT RECOGNIZED AS THE USER INPUT — S730

PERFORM OPERATION CORRESPONDING TO
RECOGNIZED USER INPUT — S740

END

PROJECTOR AND METHOD FOR CONTROLLING THE SAME

CROSS-REFERENCE TO RELATED APPLICATIONS

This application is a continuation application, under 35 U.S.C. § 111(a), of International Application No. PCT/KR2024/001671, filed on Feb. 5, 2024, which claims priority under 35 U.S.C. § 119 to Korean Patent Application No. 10-2023-0027933, filed on Mar. 2, 2023, in the Korean Intellectual Property Office, the disclosures of which are incorporated by reference herein in their entireties.

TECHNICAL FIELD

The disclosure relates to a projector and method for controlling the same, and more particularly, to a projector and method for controlling the same, which controls recognition of a user input according to a projection direction or a state of a projection surface of the projector.

BACKGROUND ART

A projector is a device for projecting a certain image onto a projection surface.

The projector may provide a large image onto an object located at a distance, i.e., a projection surface.

In recent times, in addition to an image projection, projectors allowing interaction by receiving a user input on a projection screen are being introduced.

The projectors, however, have a limit that requires an external device for interaction, requires optimization with each use, or allows interaction only in one projection direction. The projectors are not able to accurately receive the user input when the projection direction or projection distance is changed.

DISCLOSURE

Technical Solution

According to an embodiment of the disclosure, a projector includes at least one sensor; a memory storing one or more instructions; and at least one processor configured to execute the one or more instructions stored in the memory to detect a projection direction of the projector using at least one sensor of the at least one sensor, when the detected projection direction is toward a surface on which the projector is placed, detect a touch input on a projection surface, to which the projector projects an image, using at least one sensor of the at least one sensor, recognize the touch input as a user input, and perform an operation corresponding to the touch input recognized as the user input, and when the detected projection direction is toward a surface perpendicular to the surface on which the projector is placed, detect a gesture input of a user in a sensing area formed in an opposite direction of the projection surface with respect to the projector, using at least one sensor of the at least one sensor, recognize the gesture input as a user input, and perform an operation corresponding to the gesture input recognized as the user input.

According to an embodiment of the disclosure, the at least one processor may be configured to execute the one or more instructions stored in the memory to perform keystone correction when the projection surface is crooked or an obstacle is between a projection part of the projector and the projection surface, the keystone correction including controlling the projection part to emit a projection beam, and change an interpretation of the user input to correspond to the keystone correction.

According to an embodiment of the disclosure, the at least one processor may be configured to execute the one or more instructions stored in the memory to detect whether keystone correction has been performed, and, when it is detected that the keystone correction has been performed, change an interpretation of the user input to correspond to a screen on which the keystone correction is completed.

According to an embodiment of the disclosure, the at least one processor may be configured to execute the one or more instructions stored in the memory to, when the detected projection direction is toward the surface on which the projector is placed, and a distance between a projection part of the projector and the projection surface is within a certain distance, set the projector in a user input reception enable mode wherein the projection part outputs a projection beam.

According to an embodiment of the disclosure, the at least one processor may be configured to execute the one or more instructions stored in the memory to, when the detected projection direction is toward the surface on which the projector is placed, detect a touch input in a space within a certain distance from the projection surface as a touch input on the projection surface.

According to an embodiment of the disclosure, the at least one processor may be configured to execute the one or more instructions stored in the memory to, when the operation corresponding to the gesture input recognized as the user input is movement of a pointer, change an interpretation of the user input so that a traveled distance of the pointer corresponding to the gesture input recognized as the user input is equal to a traveled distance before the keystone correction.

According to an embodiment of the disclosure, the at least one processor may be configured to execute the one or more instructions stored in the memory to, when receiving a preset user input, set the projector to a user input reception disable mode to prevent detection of the touch input or the gesture input of the user.

According to an embodiment of the disclosure, the at least one sensor may include at least one of a three-dimensional (3D) time of flight (ToF) sensor, a camera, a ToF camera, an infrared (IR) camera, a depth camera, and a Lidar.

According to an embodiment of the disclosure, the at least one processor may be configured to execute the one or more instructions stored in the memory to, when the detected projection direction is toward a surface perpendicular to a ceiling to which the projector is fixed, detect a touch input of an infrared (IR) pen on the projection surface using at least one sensor of the at least one sensor, recognize the touch input of the IR pen as a user input, and perform an operation corresponding to the touch input of the IR pen recognized as the user input.

According to an embodiment of the disclosure, the at least one processor may be configured to execute the one or more instructions stored in the memory to recognize a location of the touch input of the IR pen by applying a certain algorithm to recognize the touch input of the IR pen on the projection surface.

According to an embodiment of the disclosure, a method of controlling a projector that includes at least one sensor is provided, the method including, by the projector, detecting a projection direction of the projector using at least one sensor of the at least one sensor; when the detected projection direction is toward a surface on which the projector is placed, detecting a touch input on a projection surface, to which the projector projects an image, using at least one sensor of the at least one sensor, recognizing the touch input as a user input, and performing an operation corresponding to the touch input recognized as the user input; and when the detected projection direction is toward a surface perpendicular to the surface on which the projector is placed, detecting a gesture input of a user in a sensing area formed in an opposite direction of the projection surface with respect to the projector, using at least one sensor of the at least one sensor, recognizing the gesture input as a user input, and performing an operation corresponding to the gesture input recognized as the user input.

According to an embodiment of the disclosure, the method may further include, by the projector, performing keystone correction when the projection surface is crooked or an obstacle is between a projection part of the projector and the projection surface, wherein the projection part emits a projection beam, and changing an interpretation of the user input to correspond to the keystone correction.

According to an embodiment of the disclosure, the method may further include, by the projector, detecting whether keystone correction has been performed; and when it is detected that the keystone correction has been performed, changing an interpretation of the user input to correspond to a screen on which the keystone correction is completed.

According to an embodiment of the disclosure, the method may further include, by the projector, when the detected projection direction is toward the surface on which the projector is placed, and a distance between a projection part of the projector and the projection surface is within a certain distance, setting the projector to a user input reception enable mode wherein the projection part outputs a projection beam.

According to an embodiment of the disclosure, the method may further include, by the projector, when the detected projection direction is toward the surface on which the projector is placed, detecting a touch input in a space within a certain distance from the projection surface as a touch input on the projection surface.

According to an embodiment of the disclosure, the method may further include, by the projector, when the operation corresponding to the gesture input recognized as the user input is movement of a pointer, changing an interpretation of the user input so that a traveled distance of the pointer corresponding to the gesture input recognized as the user input is equal to a traveled distance before the keystone correction.

According to an embodiment of the disclosure, the method may further include, by the projector, when a preset user input is received, setting the projector to a user input reception disable mode to prevent detection of the touch input or the gesture input of the user.

According to an embodiment of the disclosure, the at least one sensor may include at least one of a three-dimensional (3D) time of flight (ToF) sensor, a camera, a ToF camera, an infrared (IR) camera, a depth camera, or a Lidar.

According to an embodiment of the disclosure, the method may further include, by the projector, when the detected projection direction is toward a surface perpendicular to a ceiling to which the projector is fixed, detecting a touch input of an infrared (IR) pen on the projection surface using at least one sensor of the at least one sensor, recognizing the touch input of the IR pen as a user input, and performing an operation corresponding to the touch input of the IR pen recognized as the user input.

According to an embodiment of the disclosure, a non-transitory computer-readable recording medium has recorded thereon a program for carrying out, on a computer, a method of controlling a projector that includes at least one sensor, the method including, by the projector, detecting a projection direction of the projector using at least one sensor of the at least one sensor; when the detected projection direction is toward a surface on which the projector is placed, detecting a touch input on a projection surface, to which the projector projects an image, using at least one sensor of the at least one sensor, recognizing the touch input as a user input, and performing an operation corresponding to the touch input recognized as the user input; and when the detected projection direction is toward a surface perpendicular to the surface on which the projector is placed, detecting a gesture input of a user in a sensing area formed in an opposite direction of the projection surface with respect to the projector, using at least one sensor of the at least one sensor, recognizing the gesture input as a user input, and performing an operation corresponding to the gesture input recognized as the user input.

DESCRIPTION OF DRAWINGS

FIG. 7 is a flowchart illustrating a method of controlling a projector, according to an embodiment of the disclosure.

FIG. 9 is a detailed flowchart illustrating a method of controlling a projector, according to an embodiment of the disclosure.

MODE FOR INVENTION

Figure 1:
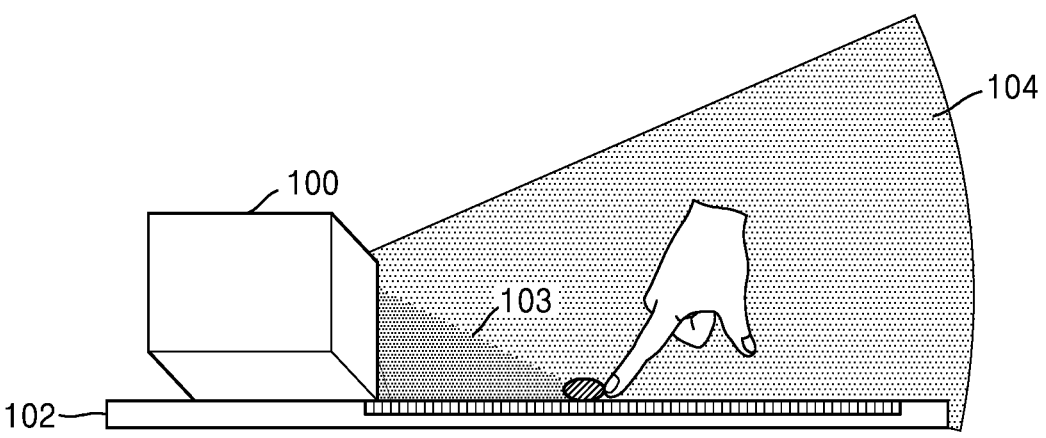
FIG. 1 illustrates an example of a projector projecting an image toward a surface, according to an embodiment of the disclosure.

Embodiments of the disclosure will now be described with reference to accompanying drawings to assist those of ordinary skill in the art in readily implementing them. However, the embodiments of the disclosure may be implemented in many different forms, and not limited thereto as will be discussed herein.

The terms are selected as common terms widely used now, taking into account principles of the disclosure, which may however depend on intentions of those of ordinary skill in the art, judicial precedents, emergence of new technologies, and the like. Therefore, the terms should not only be construed by their names, but should be defined based on their meanings and descriptions throughout the disclosure.

The terminology as used herein is only used for describing particular embodiments of the disclosure and not intended to limit the disclosure.

When A is said to "be connected" to B, it means to be "directly connected" to B or "electrically connected" to B with C located between A and C.

Throughout the specification, in claims in particular, "the" and the similar term are used to denote a thing or things already mentioned or assumed to be common knowledge. Operations for describing a method according to the disclosure may be performed in a suitable order unless the context clearly dictates otherwise. The disclosure is not, however, limited to the described order of the operations.

Expressions such as 'in some embodiments' or 'in an embodiment' mentioned throughout the specification are not intended to indicate the same embodiment.

Some embodiments of the disclosure may be described in terms of functional block elements and various processing operations. Some or all of the functional blocks may be implemented by any number of hardware and/or software components configured to perform the specified functions. For example, the functional blocks may be implemented by one or more microprocessors or circuit elements having dedicated functions. Furthermore, for example, the functional blocks may be implemented in various programing or scripting languages. The functional blocks may be implemented in algorithms executed on one or more processors. Moreover, the disclosure may employ any number of traditional techniques for electronic configuration, signal processing and/or data processing. The words "mechanism", "element", "means", and "component" are used broadly and are not limited to mechanical or physical embodiments.

Connecting lines or members between the elements illustrated in the accompanying drawings are illustratively shown as functional and/or physical connections or circuit connections. In practice, functional, physical, or circuit connections that may be replaced or added may be employed between the elements.

The terms "unit", "module", "block", etc., as used herein each represent a unit for handling at least one function or operation, and may be implemented in hardware, software, or a combination thereof.

The disclosure will now be described with reference to accompanying drawings.

Figure 2:
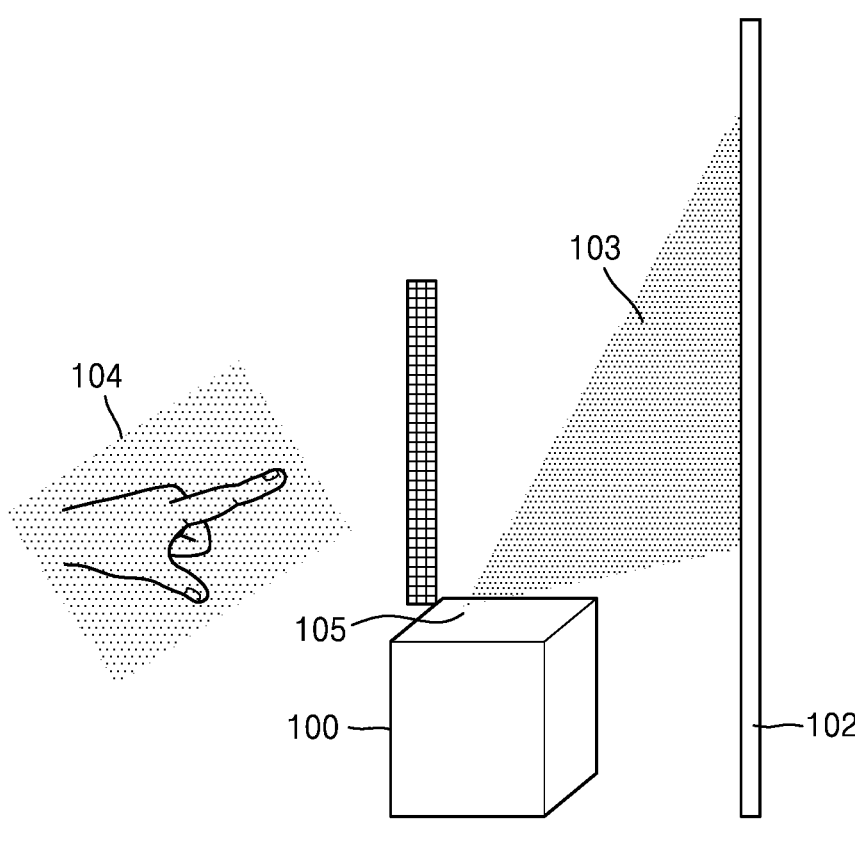
FIG. 2 illustrates an example of a projector projecting an image toward a surface perpendicular to a surface, according to an embodiment of the disclosure.
Figure 11:
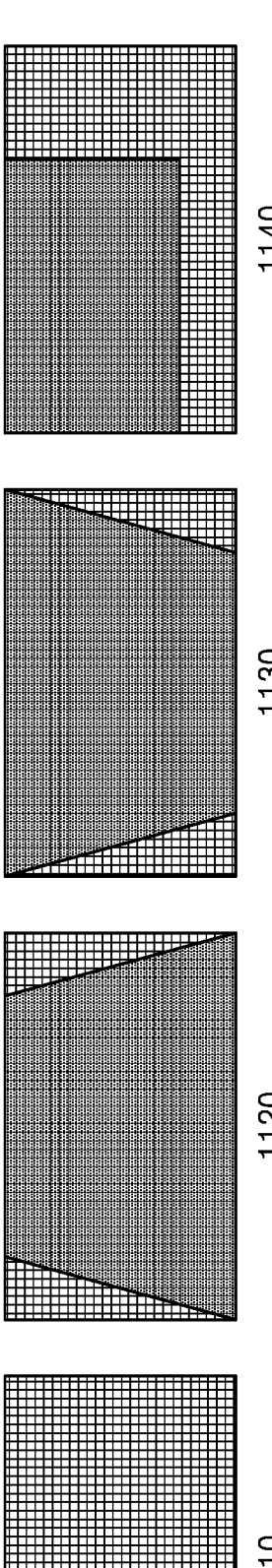
FIG. 11 illustrates possible screen changes of a projection surface when a projection direction of a projector is toward a surface on which the projector is placed, according to an embodiment of the disclosure.

FIG. 11 illustrates a projector projecting an image toward a surface, according to an embodiment of the disclosure, and FIG. 2 illustrates a projector projecting an image toward a surface perpendicular to a surface, according to an embodiment of the disclosure.

In the disclosure, a projector 100 may be an ultra short throw (UST) projector that may be used in a place close to a screen or wall that becomes a projection surface 102. The UST projector may project a large image even in a small space because it may reduce the distance between the projector and the screen which is the projection surface 102. The UST projector may be mainly used in a medium-sized space such as a home theater, a conference room, etc.

The projector 100 is not, however, limited to the UST projector, and various projectors with changeable projection directions may be used.

Furthermore, in the disclosure, the projector 100 may be a projector embedded in various electronic devices and having the changeable projection direction, or a part of the electronic device capable of performing functions of the projector.

For example, the projector 100 may be a projector embedded in various electronic devices such as a tablet personal computer (PC), a digital camera, a camcorder, a laptop computer, a netbook computer, a tablet PC, a desktop, an electric book terminal, a video phone, a digital broadcasting terminal, a personal digital assistant (PDA), a portable multimedia player (PMP), a navigation system, a wearable device, a smart refrigerator, or other home appliances and having the changeable projection direction, or a part of the electronic device capable of performing functions of the projector.

In the disclosure, the projector 100 may be stationary or mobile.

In the disclosure, the projection surface 102 may refer to a wall, surface or screen that is an object onto which the projector 100 projects an image. The projection surface 102 may be a surface on which the image is clearly seen and which reflects light intensely. The projection surface 102 may be a black or white screen.

In the disclosure, the projection direction may refer to a direction in which the projector 100 projects an image.

In the embodiment of FIG. 1, the projector 100 may project an image in a direction toward the surface on which the projector 100 is placed. In other words, in the embodiment of the disclosure of FIG. 1, a projection direction of the projector 100 may be toward the surface on which the projector 100 is placed.

The projector 100 may irradiate a projection beam 103 in a direction toward the surface on which the projector 100 is placed. In this case, even when the user has his/her hand or a tool approach the projection surface 102 to make a touch input, the approaching hand or tool for the touch input may approach the projection surface 102 from an opposite direction of a projection part from which the projection beam 103 is irradiated, and thus may not have a big influence on the image projection of the projector 100.

The projector 100 may use at least one sensor to detect the touch input of the user on the projection surface 102. The touch input may be made by a body part of the user or various input means. The projector 100 may recognize the detected touch input as a user input, and perform an operation corresponding to the recognized user input.

In the embodiment of the disclosure of FIG. 1, a sensing area 104 allowing the projector 100 to perform interactions by sensing the user input may be formed in the same direction as the projection beam irradiated from the projector 100.

In the disclosure, the sensing area 104 may refer to an area allowing at least one sensor to detect the user input or a motion for the user input.

In the embodiment of FIG. 2, the projector 100 may project an image in a direction toward a surface perpendicular to the surface on which the projector 100 is placed. In other words, in the embodiment of the disclosure of FIG. 2, a projection direction of the projector 100 may be toward a surface perpendicular to the surface on which the projector 100 is placed.

The projector 100 may irradiate the projection beam 103 in a direction toward the surface perpendicular to the surface on which the projector 100 is placed. In this case, when the user makes an approach to make a touch input, the user's hand or a tool may approach the projection surface 102 from the same direction as a projection part 105 from which the projection beam 103 is irradiated, and thus may have a big influence on the image projection of the projector 100.

Accordingly, in this case, the projector 100 may form the sensing area 104 in an opposite direction of the projection surface 102 based on the projector 100, and use the at least one sensor to detect a gesture input of the user. The projector 100 may recognize the detected gesture input of the user as a user input, and perform an operation corresponding to the recognized user input.

In the disclosure, a gesture area may refer to the sensing area 104 set up to detect the gesture input of the user. The sensing area 104 shown in the embodiment of the disclosure of FIG. 2 is merely an example, but may be set up differently based on various standards.

Figure 3A:
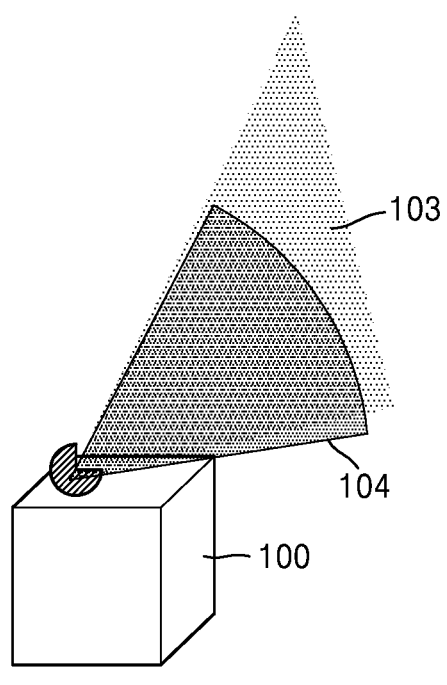
FIG. 3A illustrates an example of a projector forming a sensing area according to a projection direction, according to an embodiment of the disclosure.
Figure 3B:
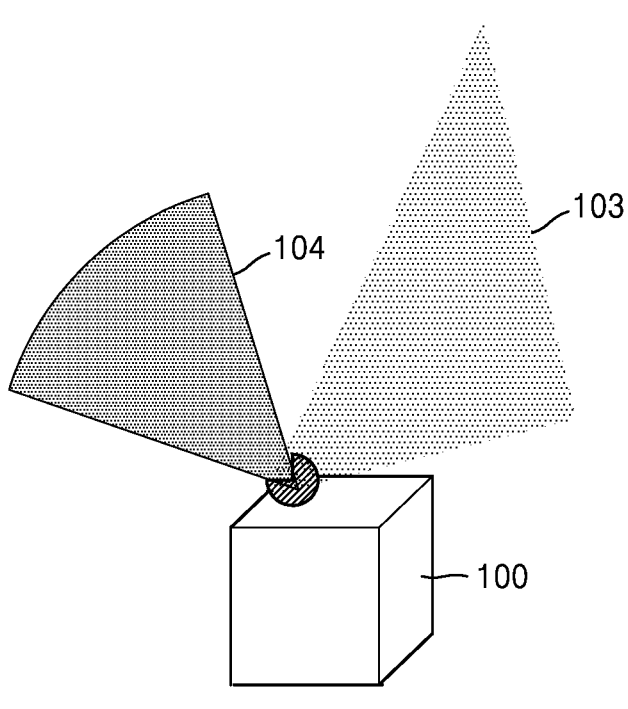
FIG. 3B illustrates a projector forming a sensing area according to a projection direction, according to an embodiment of the disclosure.

FIGS. 3A and 3B illustrate a projector forming a sensing area based on a projection direction, according to an embodiment of the disclosure.

In an embodiment of the disclosure of FIG. 3A, the projector 100 may form the sensing area 104 in the same direction as a direction in which the projection beam 103 is irradiated. In this case, the projection direction of the projector 100 is toward the surface on which the projector 100 is placed, and the projector 100 may detect a touch input of the user on the projection surface in the sensing area 104 formed in the same direction as the projection surface based on the projector 100.

In an embodiment of the disclosure of FIG. 3B, the projector 100 may form the sensing area 104 in an opposite direction of a direction in which the projection beam 103 is irradiated. In this case, the projection direction of the projector 100 is toward a surface perpendicular to the surface on which the projector 100 is placed, and the projector 100 may detect a gesture input of the user in the sensing area 104 formed in the opposite direction of the projection surface based on the projector 100.

As seen from the embodiments of the disclosure of FIGS. 3A and 3B, the projector 100 may set up a different sensing area depending on the projection direction or detect a different type of user input.

In an embodiment of the disclosure, the projector 100 may use an acceleration sensor to identify the projection direction.

The acceleration sensor is a sensor for measuring acceleration of a linear motion. The acceleration sensor may also measure acceleration of gravity on earth. In a case that the projector 100 is motionless, the acceleration sensor measures an influence of the gravitational acceleration on each axis, so based on this value of the measurement, the projector 100 including the acceleration sensor may identify how much the projector 100 is tilted to the gravitational direction.

The projector 100 may use the acceleration sensor to identify whether the projection direction is toward the surface on which the projector 100 is placed, toward a surface perpendicular to the surface on which the projector 100 is placed, or toward a surface perpendicular to the ceiling to which the projector 100 is fixed. In an embodiment of the disclosure, the projector 100 may use a tilt sensor to identify the projection direction.

In an embodiment of the disclosure, the projector 100 may identify the projection direction by using the acceleration sensor or the tilt sensor along with a range sensor.

How the projector 100 identifies the projection direction is not limited thereto, and the projector 100 may identify the projection direction in other various methods than described above.

In the disclosure, the projector 100 may set up a different sensing area and sensing method depending on the identified projection direction and change a method of interpreting the user input depending on a change in state of the projection surface, thereby facilitating interactions between the projector 100 and the user and increasing usability of the interacting function.

Figure 4:
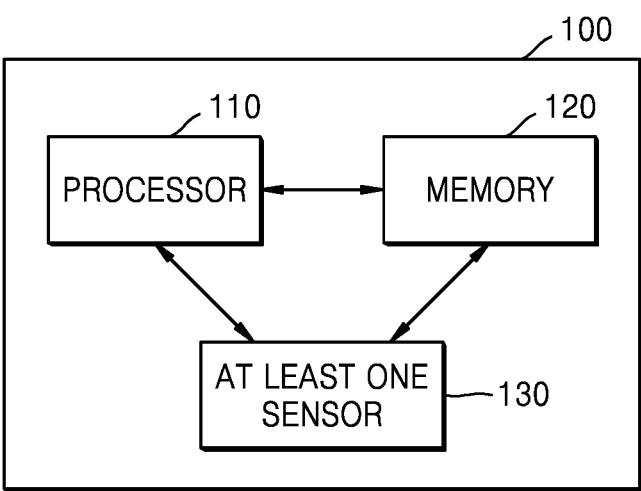
FIG. 4 is a block diagram illustrating a configuration of a projector, according to an embodiment of the disclosure.

FIG. 4 is a block diagram of a projector, according to an embodiment of the disclosure.

Referring to FIG. 4, the projector 100 may include a processor 110, a memory 120 and at least one sensor 130.

The memory 120 may store a program for processing and controlling of the processor 110. The memory 120 may also store data input to or output from the projector 100.

The memory 120 may include at least one of an internal memory (not shown) or an external memory (not shown). The memory 120 may store control history information, current condition information and status information.

The memory 120 may include at least one type of storage medium including a flash memory, a hard disk, a multimedia card micro type memory, a card type memory (e.g., SD or XD memory), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, and an optical disk.

The internal memory may include, for example, at least one of a volatile memory (e.g., a dynamic RAM (DRAM), an SRAM, a synchronous DRAM (SDRAM), etc.), a non-volatile memory (e.g., a one-time programmable ROM (OTPROM), a PROM, an erasable PROM (EPROM), an EEPROM, a mask ROM, a flash ROM, etc.), a hard disc drive (HDD) or a solid-state drive (SSD).

In an embodiment of the disclosure, the processor 110 may load an instruction or data received from at least one of the non-volatile memory or another component onto the volatile memory and process the instruction or data. Furthermore, the processor 110 may preserve data received from or generated by the other component in the non-volatile memory.

The external memory may include, for example, at least one of compact flash (CF), secure digital (SD), micro secure digital (Micro-SD), mini secure digital (Mini-SD), extreme digital (xD), or a memory stick.

The memory 120 may store the at least one instruction to be executed by the processor 110.

In an embodiment of the disclosure, the memory 120 may store various information input through an input/output device (not shown).

In an embodiment of the disclosure, the memory 120 may store instructions to control the processor 110 to use the acceleration sensor among the at least one sensor 130 to detect a projection direction of the projector 100, use the at least one sensor 130 to detect a touch input on the projection surface and recognize it as a user input when the detected projection direction is toward the surface on which the projector 100 is placed, use the at least one sensor 130 to detect a gesture input of the user in a sensing area formed in an opposite direction of the projection surface based on the projector 100 and recognize it as a user input when the detected projection direction is toward a surface perpendicular to the surface on which the projector 100 is placed, and perform an operation corresponding to the recognized user input.

The processor 110 may run an operating system (OS) and various applications stored in the memory 120 at the user's request or when a preset and stored condition is met.

The processor 110 may include a random-access memory (RAM) to store a signal or data received from outside of the projector 100 or to be used for a storage sector corresponding to various tasks performed in the projector 100, and a read-only memory (ROM) to store a control program to control the projector 100.

The processor 110 may include a single core, dual cores, triple cores, quad cores, and their multiple cores. The processor 110 may also include a plurality of processors. For example, the processor 110 may be implemented with a main processor (not shown) and a sub processor (not shown) activated in a sleep mode.

Furthermore, the processor 110 may include at least one of a central processing unit (CPU), a graphic processing unit (GPU) or a video processing unit (VPU). Alternatively, it may be implemented in the form of a system on chip (SoC) that integrates at least one of the CPU, the GPU or the VPU.

The processor 110 may execute one or more instructions stored in the memory 120 to control various components in the projector 100.

In an embodiment of the disclosure, the processor 110 may use the acceleration sensor among the at least one sensor 130 to detect a projection direction of the projector 100. In an embodiment of the disclosure, the processor 110 may use the at least one sensor 130 to detect a touch input on the projection surface and recognize it as a user input when the detected projection direction is toward the surface on which the projector 100 is placed. In an embodiment of the disclosure, the processor 110 may use the at least one sensor 130 to detect a gesture input of the user in a sensing area formed in an opposite direction of the projection surface based on the projector 100 and recognize it as a user input when the detected projection direction is toward a surface perpendicular to the surface on which the projector 100 is placed. In an embodiment of the disclosure, the processor 110 may perform an operation corresponding to the recognized user input.

In an embodiment of the disclosure, the processor 110 may perform keystone correction when the projection surface is crooked or there is an obstacle between the projection part of the projector 100 that emits a projection beam and the projection surface, and change the interpretation of the user input to suit the keystone correction.

In an embodiment of the disclosure, the processor 110 may detect whether the keystone correction has been performed, and when detecting that the keystone correction has been performed, change the interpretation of the user input to suit a screen on which the keystone correction is completed.

In an embodiment of the disclosure, the processor 110 may activate a user input reception enable mode when the detected projection direction is toward the surface on which the projector 100 is placed and the distance between the projection part of the projector 100 that outputs a projection beam and the projection surface corresponds to a certain distance or has a difference from the certain distance within a threshold.

In an embodiment of the disclosure, the processor 110 may recognize a touch input in a space within a certain distance from the projection surface as a touch input on the projection surface when the detected projection direction is toward the surface on which the projector 100 is placed.

In an embodiment of the disclosure, when an operation corresponding to the detected gesture input is a movement of a pointer, the processor 110 may change an interpretation of the user input so that movement speed of the pointer is equal to speed before the keystone correction.

In an embodiment of the disclosure, when receiving a certain user input, the processor 110 may set the projector 100 into a user input reception disable mode to prevent detection of touch inputs or gesture inputs of the user.

In an embodiment of the disclosure, the processor 110 may use the at least one sensor 130 to detect a touch input of an infrared (IR) pen on the projection surface and recognize the touch input as a user input, when the detected projection direction is toward a surface perpendicular to the ceiling to which the projector 100 is fixed.

The at least one sensor 130 may include various types of sensors.

For example, the at least one sensor 130 may include a proximity sensor, a range sensor, an illumination sensor, a touch sensor, an acceleration sensor, a tilt sensor, a magnetic sensor, a gravity sensor (G-sensor), a gyroscope sensor, a motion sensor, a red-green-blue (RGB) sensor, an IR sensor, a finger scan sensor, an ultrasonic sensor, an optical sensor, an environment sensor such as an atmospheric pressure sensor, a humidity sensor, a temperature sensor, a radioactivity detection sensor, a heat detection sensor, a gas detection sensor, etc., and a chemical sensor such as an electronic nose, a health care sensor, a biometric sensor, etc.

The range sensor is a sensor for measuring a distance between the sensor and an external object. In an embodiment of the disclosure, the projector 100 may include at least one of range sensors such as a three-dimensional (3D) time of flight (ToF) sensor, a camera, a ToF camera, an IR camera, a depth camera, or a Lidar.

The range sensor that may be equipped in the projector 100 is not, however, limited thereto.

In an embodiment of the disclosure, the projector 100 may be equipped with a plurality of range sensors, in which case, a rotation angle between the projector 100 and the projection surface may be estimated based on a distance measured by each range sensor, a gap between the respective range sensors, and the like.

The block diagram of the projector 100 as shown in FIG. 4 is merely for an embodiment. Components of the block diagram may be merged, added or omitted according to actual specifications of the projector 100. In other words, two or more components may be merged into one, or a single component may be split into two or more components as needed. Functions performed in the blocks are shown for explaining the embodiment of the disclosure, and the disclosure is not limited to the detailed operation or components corresponding to the blocks.

Figure 5:
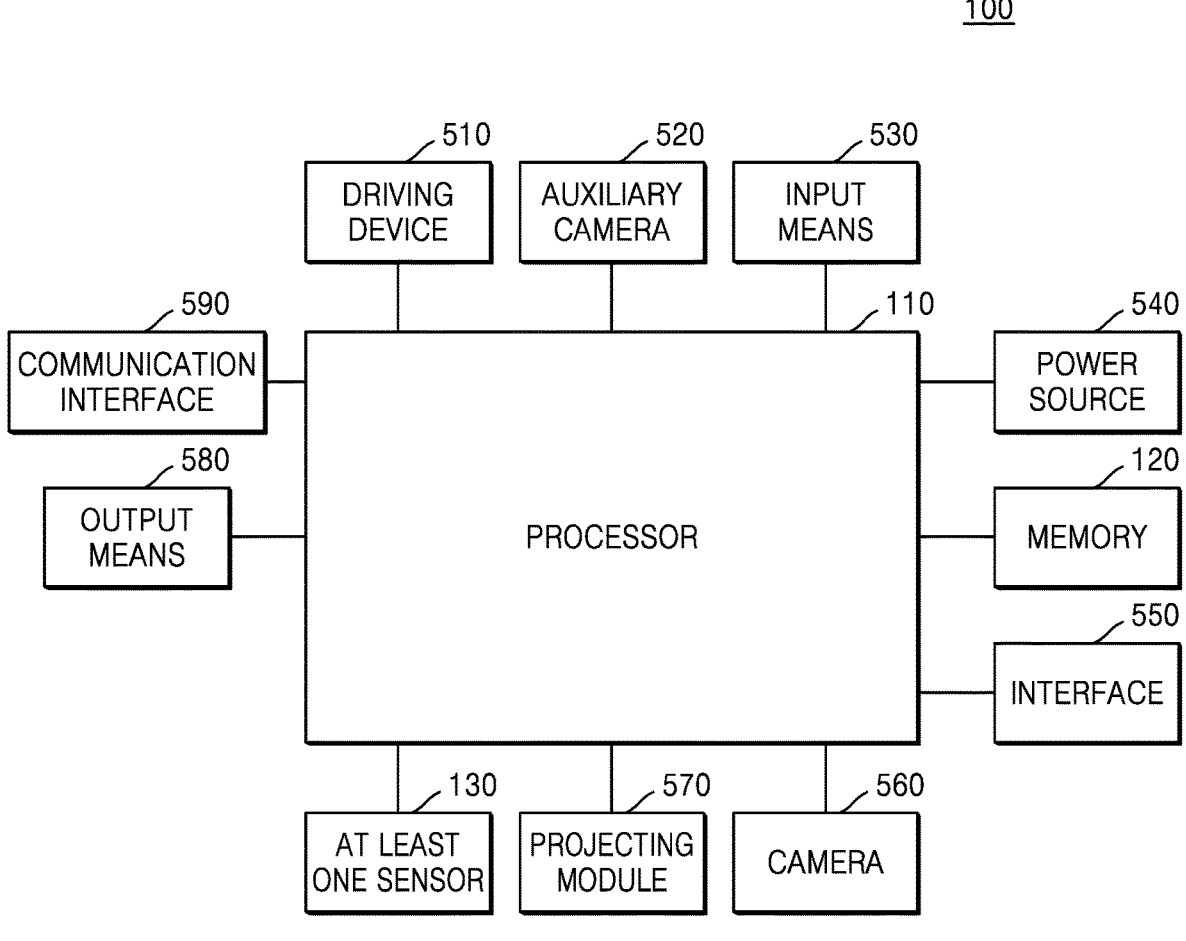
FIG. 5 is a detailed block diagram illustrating a configuration of a projector, according to an embodiment of the disclosure.

FIG. 5 is a detailed block diagram of a projector, according to an embodiment of the disclosure.

Referring to FIG. 5, the projector 100 may include a projecting module 570. The projecting module 570 may be configured to project an image of a certain size onto a projection surface at a certain distance away from the projector 100. The projection module 570 may irradiate a projection beam. The image may be one that is stored in the projector 100 or received from an external device.

In an embodiment of the disclosure, the projecting module 570 may include the projection part 105, an outlet through which the projection beam is irradiated to the outside.

In an embodiment of the disclosure, the projecting module 570 may include an imaging device for receiving an image signal from the external device and generating a projection image. The projection image may be enlarged, processed and projected out of the projecting module 570 by optics or an optics system installed on the projecting module 570. The projecting module 570 may use an additional light source to amplify the generated projection image. The projecting module 570 may be classified into a cathode ray tube (CRT) type, a liquid crystal display (LCD) type, a digital light processing (DLP) type, a liquid crystal on silicon (LCoS) type, a laser beam steering (LBS) type, etc.

In an embodiment of the disclosure, the projector 100 may include a camera 560.

In an embodiment of the disclosure, the camera 560 may belong to the at least one sensor, but in the embodiment of the disclosure of FIG. 5, it is shown as an extra component.

The camera 560 may measure a distance to a certain external object.

In an embodiment of the disclosure, the camera 560 may include a ToF sensor for measuring a distance. A camera including the ToF sensor may be a ToF camera.

The ToF camera may irradiate light having a certain band wavelength to a certain area of an object and receive light bouncing off of the certain area of the object. The ToF camera may measure a round-trip time between the object and the ToF camera by detecting a relative phase difference of the light reflecting from the certain area of the object and received by each pixel, and measure a distance to the object based on the measured time.

As the ToF camera is able to continuously irradiate light and receive reflected light, it may measure continuous changes in distance of an object to the camera 560.

In an embodiment of the disclosure, the camera 560 may detect a motion of the object by measuring the continuous changes in distance of the object. In general, an interaction between the user and the projector 100 may be made through a motion, i.e., a gesture, of a hand of the user or other input tool. Hence, the camera 560 may detect a user input formed with a gesture including such a touch.

In an embodiment of the disclosure, the projector 100 may include an auxiliary camera 520 in addition to the camera 560. The auxiliary camera 520 may be one of input means unlike the camera 560 for distance measurement and input detection, and may obtain visual information about actual environment around the projector 100, i.e., an image. The auxiliary camera 520 may include a visible image camera configured to obtain e.g., a visible ray image, i.e., a normal color image.

Furthermore, the auxiliary camera 520 may include a non-visible ray image camera configured to obtain a non-visible ray image, e.g., an IR image or a thermal image, and the non-visible ray image camera may not only obtain simple surrounding environment information but also be used for night watch.

In an embodiment of the disclosure, apart from the camera 560 and the auxiliary camera 520 that are input means for image information, the projector 100 may further include an input means 530 configured to obtain information of another type or types. The input means 530 may include an audio input means such as a microphone for inputting an audio signal. Audio data collected through the audio input means may go through a recognition procedure and may be received as a command of the user.

In an embodiment of the disclosure, the input means 530 may include a user input means configured to receive information and a command directly from the user, such as a mechanical switch or key or a virtual key provided on a display.

In an embodiment of the disclosure, the projector 100 may include a communication interface 590 that communicatively connects the projector 100 to an external device and a network. The communication interface 590 may include a wired communication interface and a wireless communication interface. The wired communication interface may include ordinary Ethernet devices. The wireless communication interface may include a broadcast reception module, a mobile communication module, a wireless Internet module, a short-range communication module, or a location information module. Using this communication interface 590, the projector 100 may receive images from the external device or the network.

In an embodiment of the disclosure, the projector 100 may transmit control information or signals to the external device through the communication interface 590 according to an input given for the image to control the external device.

The projector 100 may further include an output means 580 configured to output various additional information in addition to an image output means, the projecting module 570.

The output means 580 may generate various outputs related to vision, hearing or touch. For example, the output means 580 may include a display for outputting images, an audio output device such as a speaker, a vibration device for producing vibrations, a light source for emitting light, etc.

In an embodiment of the disclosure, the display may be provided on the main body of the projector 100 and may display information relating to operation of the projector 100, e.g., an interface for controlling the operation. In an embodiment of the disclosure, the display may be implemented with a touch screen including a touch sensor.

The projector 100 may also include the at least one sensor 130 with which to receive information about a surrounding environment in addition to the information obtained from the camera 560, the auxiliary camera 520 and the input means 530.

The processor 110, the memory 120 and the at least one sensor 130 may be equal to what are described above in connection with FIG. 4.

In an embodiment of the disclosure, the projector 100 may include a driving device 510 configured to move the main body to various directions.

For example, the driving device 510 may include an actuator such as a motor configured to generate power. The driving device 510 may include a supporting device such as a bearing to stably support a portion of the moving main body.

Furthermore, an interface 550 may serve as a passage to various types of external devices connected to the projector 100. The interface 550 may include a wired/wireless headset port, an external charger port, a wired/wireless data port, a memory card port, a port connected to a device equipped with an identification module, an audio input/output (I/O) port, a video I/O port, an earphone port or the like.

In an embodiment of the disclosure, the projector 100 may include a power source 540.

The power source 540 may receive external power or internal power and supply the power to the respective components included in the projector 100, under the control of the processor 110.

In an embodiment of the disclosure, the power source 540 may include a rechargeable battery. With the rechargeable battery, the projector 100 may have an independent power source and conveniently move to various locations in the actual environment.

The block diagram of the projector 100 as shown in FIG. 5 is merely for an embodiment. Components of the block diagram may be merged, added or omitted according to actual specifications of the projector 100. In other words, two or more components may be merged into one, or a single component may be split into two or more components as needed. Functions performed in the blocks are shown for explaining the embodiment of the disclosure, and the disclosure is not limited to the detailed operation or components corresponding to the blocks.

Figure 6:
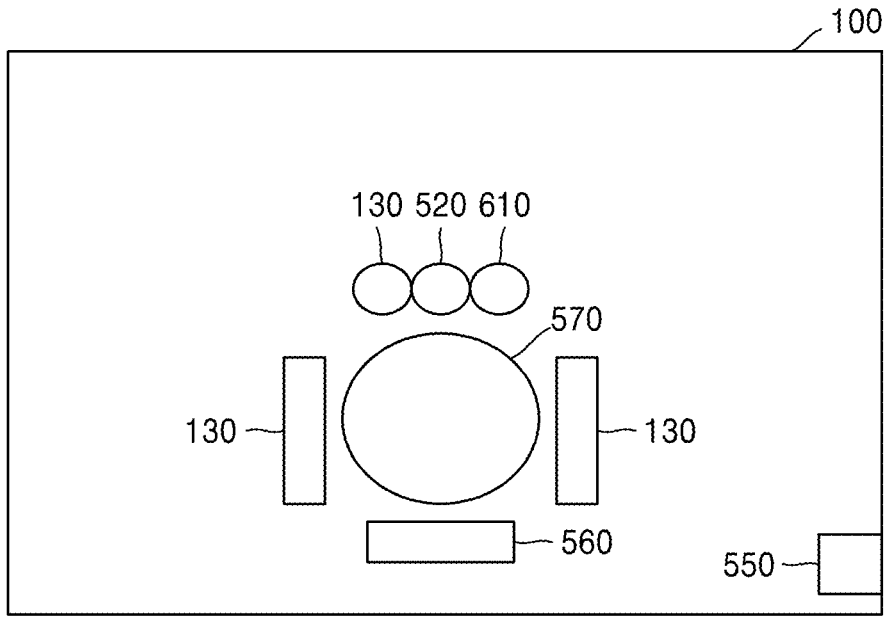
FIG. 6 is a plan view illustrating a configuration of a projector, according to an embodiment of the disclosure.

FIG. 6 is a plan view of a projector, according to an embodiment of the disclosure.

The embodiment of FIG. 6 is an example of a layout of the respective components in the projector 100, which may include some of the components as shown in FIG. 5.

Referring to FIG. 6, the projector 100 may have the at least one sensor 130 arranged on the left and right of the projecting module 570.

In the embodiment of FIG. 6, the projector 100 may have the camera 560 arranged under the projecting module 570 and have the at least one sensor 130, the auxiliary camera 520 and a light source 610 arranged above the projecting module 570.

In the embodiment of FIG. 6, the projector 100 may have the interface 550 arranged on a side of the main body.

The layout of the respective components in the projector 100 is not, however, limited thereto, and there may be other various layouts.

FIG. 7 is a flowchart illustrating a method of controlling a projector, according to an embodiment of the disclosure.

Referring to FIG. 7, the projector 100 may use at least one sensor 130 to detect a projection direction of the projector 100, in operation S710.

In an embodiment of the disclosure, the projector 100 may use an acceleration sensor or a tilt sensor among the at least one sensor 130 to detect the projection direction of the projector 100.

The projector 100 may use the at least one sensor 130 to detect a touch input on the projection surface, recognize it as a user input and perform an operation corresponding to the touch input recognized as the user input in operation S720, when the detected projection direction is toward the surface on which the projector 100 is placed.

The projector 100 may use the at least one sensor 130 to detect a touch input on the projection surface and recognize it as a user input, when the detected projection direction is toward the floor on which the projector 100 is placed.

In an embodiment of the disclosure, the projector 100 may project an image toward the surface on which the projector 100 is placed, while being on the surface.

In an embodiment of the disclosure, while being on the surface, the projector 100 may project an image toward a table on which the projector 100 is placed. In this case, as a distance between the projection part 105 of the projector 100 and the projection surface 102, the table is constant (or corresponds to a certain distance), a maximum size of the projection screen may also be constant to an extent that does not significantly deviate from a designated size. In this case, a sensing area may also be formed to have a constant size.

In an embodiment of the disclosure, the projector 100 may use a range sensor such as a 3D-ToF sensor, a camera, a ToF camera, an IR camera, a depth camera, a Lidar, etc., to obtain a distance between the projection part 105 of the projector 100 and the projection surface 102.

In an embodiment of the disclosure, when the detected projection direction is toward the surface on which the projector 100 is placed and the distance between the projection part 105 of the projector 100, which outputs a projection beam, and the projection surface 102 corresponds to the certain distance, the projector 100 may recognize itself as being ready to receive a user input. In this case, the projector 100 may activate the user input reception enable mode. In the user input reception enable mode, the projector 100 may enable interactions with the user.

The certain distance between the projection part 105 and the projection surface 102 may be determined in a manufacturing stage of the projector 100 or reset later.

In an embodiment of the disclosure, when the distance between the projection part 105 of the projector 100 and the projection surface 102 has a difference from the certain distance within a threshold, the projector 100 may recognize that it is ready to receive a user input. In this case, the projector 100 may activate the user input reception enable mode. The threshold may be set by the user manually or by the projector 100 automatically.

In an embodiment of the disclosure, even when the projector 100 is horizontally rotated, it may enter into the user input reception enable mode when the distance between the projection part 105 and the projection surface 102 corresponds to the certain distance or has a difference from the certain distance within the threshold.

In an embodiment of the disclosure, when the distance between the projection part 105 and the projection surface 102 does not correspond to the certain distance or has a bigger difference from the certain distance than the threshold, the projector 100 may enter into the user input reception disable mode.

In the user input reception disable mode, the projector 100 may not detect any motion in the sensing area. In this case, the projector 100 may operate as a normal projection device that is unable to make interactions with the user.

In an embodiment of the disclosure, the projector 100 may enter into the user input reception disable mode by receiving a certain user input.

In an embodiment of the disclosure, the certain user input may be received through an external device such as a remote controller.

In an embodiment of the disclosure, the certain user input may be received by the user's hand or various input tools remaining in a certain operation for a certain period of time in the sensing area.

In an embodiment of the disclosure, the certain user input may be received by performing a certain operation through the user's hand or various input tools in a set portion of the sensing area.

In an embodiment of the disclosure, the projector 100 may change the settings into the user input reception enable mode when the projection direction detected while in the user input reception disable mode is toward the surface on which the projector 100 is placed and the distance between the projection part 105 of the projector 100 that outputs a projection beam and the projection surface 102 corresponds to the certain distance or has a difference from the certain distance within a threshold.

In an embodiment of the disclosure, when the projection area is changed due to appearance of an obstacle, tilting of the projection surface or adjustment of the screen size, the projector 100 may relate processing of the sensing area with processing of the projection area to allow interactions in the same sensing area as the projection area. This will be described in detail in connection with FIG. 11.

In an embodiment of the disclosure, the projector 100 may detect a touch input on the projection surface when the detected projection direction is toward the surface on which the projector 100 is placed.

In the disclosure, the touch input may refer to any input using a touch such as click, double-click, drag and drop, etc.

In an embodiment of the disclosure, the operation corresponding to the recognized user input may be predetermined.

In an embodiment of the disclosure, the operation corresponding to the recognized user input may be predetermined and stored in the memory 120.

In an embodiment of the disclosure, the operation corresponding to the recognized user input may be set differently for each projector 100.

In an embodiment of the disclosure, the operation corresponding to the recognized user input may be changed by the user.

In an embodiment of the disclosure, the operation corresponding to the recognized user input may include various operations such as stopping the projector 100, stopping an application, starting an application, selecting an item, moving a cursor, moving an item, turning a page, inserting a highlight, etc.

When the detected projection direction is toward a surface perpendicular to the surface on which the projector 100 is placed, the projector 100 may use the at least one sensor 130 to detect a gesture input of the user in a sensing area formed in an opposite direction of the projection surface based on the projector 100, recognize it as a user input and perform an operation corresponding to the touch input recognized as the user input, in operation S730.

In an embodiment of the disclosure, when the projector 100 projects an image in a direction toward a surface perpendicular to the surface on which the projector 100 is placed, the projector 100 has difficulty in detecting a direct touch input on the projection surface 102 as opposed to a case that the projection direction is toward to surface on which the projector 100 is placed, because a body part of the user or other input means approaching the projection surface 102 may hide the screen or the sensor.

In an embodiment of the disclosure, the projector 100 may receive a user input by detecting a gesture input in the vicinity of the projector 100.

In the disclosure, the gesture input may include various operations such as a palm or finger-based swiping operation, an operation of clenching a fist, a click operation using one or more fingers, a pointing operation, etc.

In an embodiment of the disclosure, the projector 100 may determine a certain area not hiding the sensor or screen in the vicinity of the projector 100 as the sensing area, and detect a gesture input of the user in the determined sensing area.

In an embodiment of the disclosure, the certain area that is not hiding the sensor or screen in the vicinity of the projector 100 may be formed in an opposite direction of the projection surface based on the projector 100.

In an embodiment of the disclosure, the certain area that is not hiding the sensor or screen in the vicinity of the projector 100 may be determined by the projector 100 automatically or set manually by receiving an input of the user.

In an embodiment of the disclosure, the certain area that is not hiding the sensor or screen in the vicinity of the projector 100, i.e., the sensing area, may be constant regardless of a change in size or shape of the projection screen.

In an embodiment of the disclosure, the projector 100 may perform various screen adjustments depending on the condition between the projector 100 and the projection surface 102, and change an interpretation of the user input accordingly. This will be described in detail later in connection with FIGS. 12 and 13.

In an embodiment of the disclosure, the operation corresponding to the recognized user input may be predetermined.

In an embodiment of the disclosure, the operation corresponding to the recognized user input may be predetermined and stored in the memory 120.

In an embodiment of the disclosure, the operation corresponding to the recognized user input may be set differently for each projector 100.

In an embodiment of the disclosure, the operation corresponding to the recognized user input may be changed by the user.

In an embodiment of the disclosure, the operation corresponding to the recognized user input may include various operations such as stopping the projector 100, stopping an application, starting an application, selecting an item, moving a cursor, moving an item, turning a page, inserting a highlight, etc.

Figure 8:
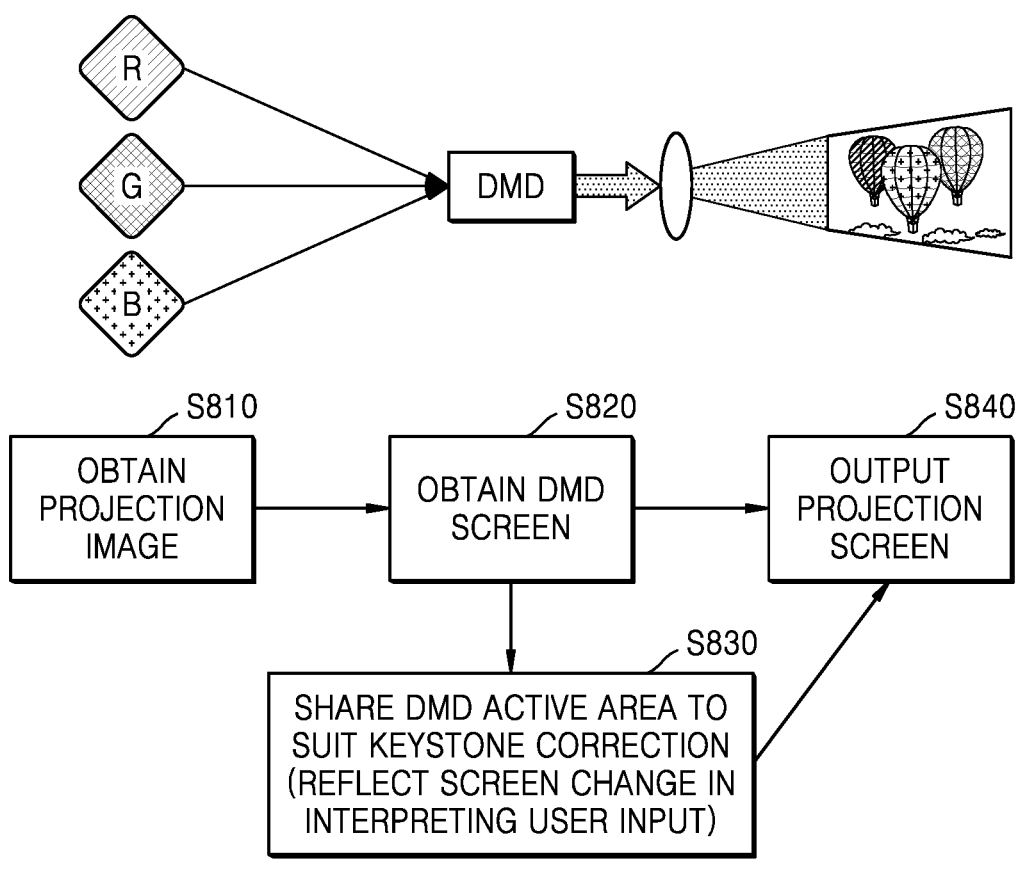
FIG. 8 illustrates a procedure in which a projector recognizes a change in screen and reflects the change in screen in interpreting a user input, according to an embodiment of the disclosure.

FIG. 8 illustrates a procedure in which a projector recognizes a change in screen and reflects the change in screen in interpreting a user input, according to an embodiment of the disclosure.

The projector 100 may obtain, from an external device or the memory 120, an image to be projected, in operation S810.

The projector 100 may project the image after enlarging the image by reflecting the image on a digital mirror device (DMD).

The DMD may be arranged in a path of the emitted projection beam for reflecting the projection beam in one direction by using a plurality of micro-mirrors that receive and turn on and off electronic signals to correspond to a patterned image designed to be arranged in at least one row and column.

The projector 100 may adjust the projection screen on which the image is projected, through keystone correction.

The keystone correction or digital keystone correction herein may refer to correction to manipulate an image vertically or horizontally without shift of a physical lens to correctly display the image on the projection surface. The keystone correction may be digitally performed before passing through the lens.

Screen adjustment through lens shift is effective when the lens of the projector 100 is perpendicular to the projection surface, but when it is not possible to obtain a correct lens-to-projection surface angle that allows the image to be seen in a uniform rectangle from every side, the keystone correction may be required.

For example, when the highest portion of the projected image is narrower or wider than the lowest portion or when one of the left and right portions of the projected image is narrower or wider than the other portion, the keystone correction may be required.

In an embodiment of the disclosure, the keystone correction may be performed through a menu function on the display of the projector 100 or by using a dedicated control button of the projector 100 or a remote controller.

The DMD reflects a result in which the keystone correction is reflected, so a DMD screen may be a screen on which the result of the keystone correction is reflected.

The projector 100 may obtain a DMD screen in operation S820.

After the keystone correction is performed, the projector 100 may share a DMD active area to interpret a user input to suit the keystone correction, in operation S830. The DMD active area herein may refer to a DMD screen that reflects keystone-corrected content.

In an embodiment of the disclosure, the projector 100 may deliver the DMD active area to the processor 110 to share it to interpret a user input to suit the keystone correction.

The projector 100 may output a projection screen based on the DMD screen, in operation S840.

The projector 100 may output the projection screen on the projection surface based on the DMD screen.

Figure 9:
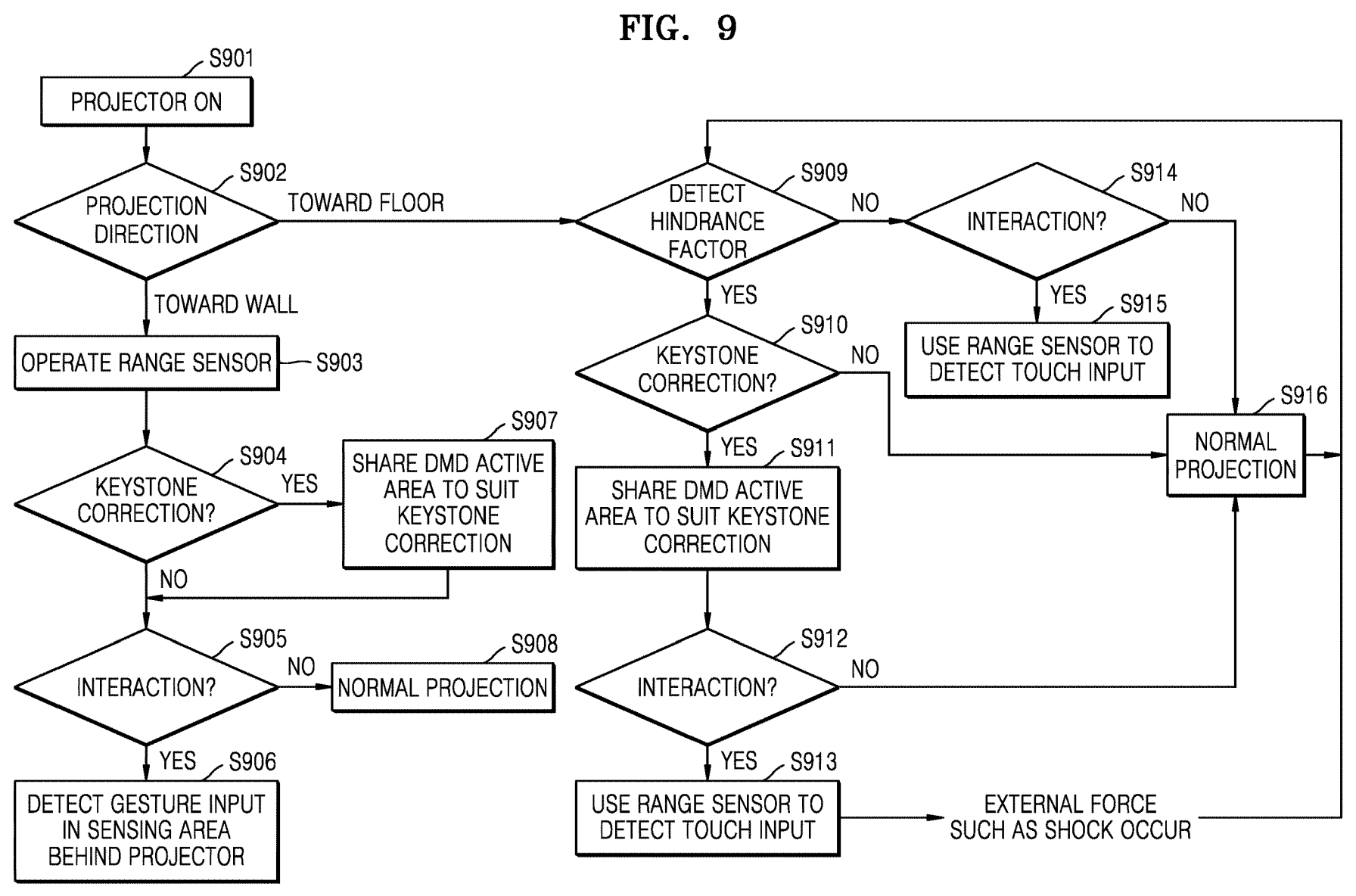

FIG. 9 is a detailed flowchart illustrating a method of controlling a projector, according to an embodiment of the disclosure, When the projector 100 is powered on in operation S901, the projector 100 may detect a projection direction in operation S902.

When the projection direction is toward a surface perpendicular to the surface on which the projector 100 is placed, i.e., a wall, the projector 100 may operate a range sensor in operation S903.

By operating the range sensor, the projector 100 may estimate a size of a screen projected on the projection surface.

The projector 100 may determine whether the keystone correction has been performed, in operation S904.

When the keystone correction has not been performed, the projector 100 may make an interaction in operation S905.

When the keystone correction has not been performed, the projector 100 may determine whether an interaction has been made with the user without an extra work in operation S905.

When the interaction has been made, the projector 100 may detect a gesture input in a sensing area behind the projector 100 in operation S906.

The area behind the projector 100 may be opposite of the projection surface. Specifically, the projector 100 may form a sensing area on a side that does not hinder projection of images, and detect a gesture input of the user in the sensing area.

When the interaction has not been made, the projector 100 may perform normal projection in operation S908.

After the keystone correction is performed, the projector 100 may share a DMD active area to interpret a user input to suit the keystone correction, in operation S907.

In an embodiment of the disclosure, the projector 100 may project the image after enlarging the image by reflecting the image on a DMD.

The projector 100 may adjust the screen, on which the image is to be projected, through keystone correction.

In an embodiment of the disclosure, the projector 100 may deliver the DMD active area to the processor 110 that controls at least one sensor and share it to interpret a user input to suit the keystone correction.

The projector 100 may determine whether an interaction with the user has been made in operation S905.

When the interaction has been made, the projector 100 may detect a gesture input in a sensing area behind the projector 100 in operation S906.

When the interaction has not been made, the projector 100 may perform normal projection in operation S908.

When the projection direction is toward the surface on which the projector 100 is placed, the projector 100 may detect a hindrance factor in operation S909.

In an embodiment of the disclosure, the hindrance factor may refer to factors that may affect the projection image, which include a bump or hole on the surface, inclination of the surface, an obstacle, etc.

When the hindrance factor is not detected, the projector 100 may determine whether an interaction with the user has been made in operation S914.

In an embodiment of the disclosure, when there is no obstacle and the projection surface is completely flat, the hindrance factor may not be detected.

When the interaction has been made, the projector 100 may use a range sensor to detect a touch input in operation S915.

When the interaction has been made, the projector 100 may use the range sensor to detect a touch input on the projection surface or in an area in the vicinity of the projection surface. When the hindrance factor is not detected, the projection area and the sensing area may correspond to each other as it is originally determined.

When the interaction has not been made, the projector 100 may perform normal projection in operation S916.

When the hindrance factor is detected, the projector 100 may determine whether the keystone correction has been performed in operation S910.

When an obstacle is detected or the projection surface is not completely flat, the projector 100 may detect a hindrance factor and perform the keystone correction.

The projector 100 may determine whether the keystone correction has been performed in operation S910.

Interaction made when the keystone correction has not been performed even though a hindrance factor was detected may cause an error, so the projector 100 may perform normal projection without interaction in operation S916.

After a hindrance factor is detected and associated keystone correction is performed, the projector 100 may share a DMD active area to interpret a user input to suit the keystone correction, in operation S911.

The projector 100 may determine whether an interaction with the user has been made in operation S912.

When the interaction has been made, the projector 100 may use a range sensor to detect a touch input in operation S913.

When the interaction has been made, the projector 100 may use the range sensor to detect a touch input on the projection surface or in an area in the vicinity of the projection surface.

When the interaction has not been made, the projector 100 may perform normal projection in operation S916.

When the projection direction is toward the surface on which the projector 100 is placed, and there is external force such as a shock during the projection process, the projector 100 may perform detection of a hindrance factor again in operation S909.

Figure 10:
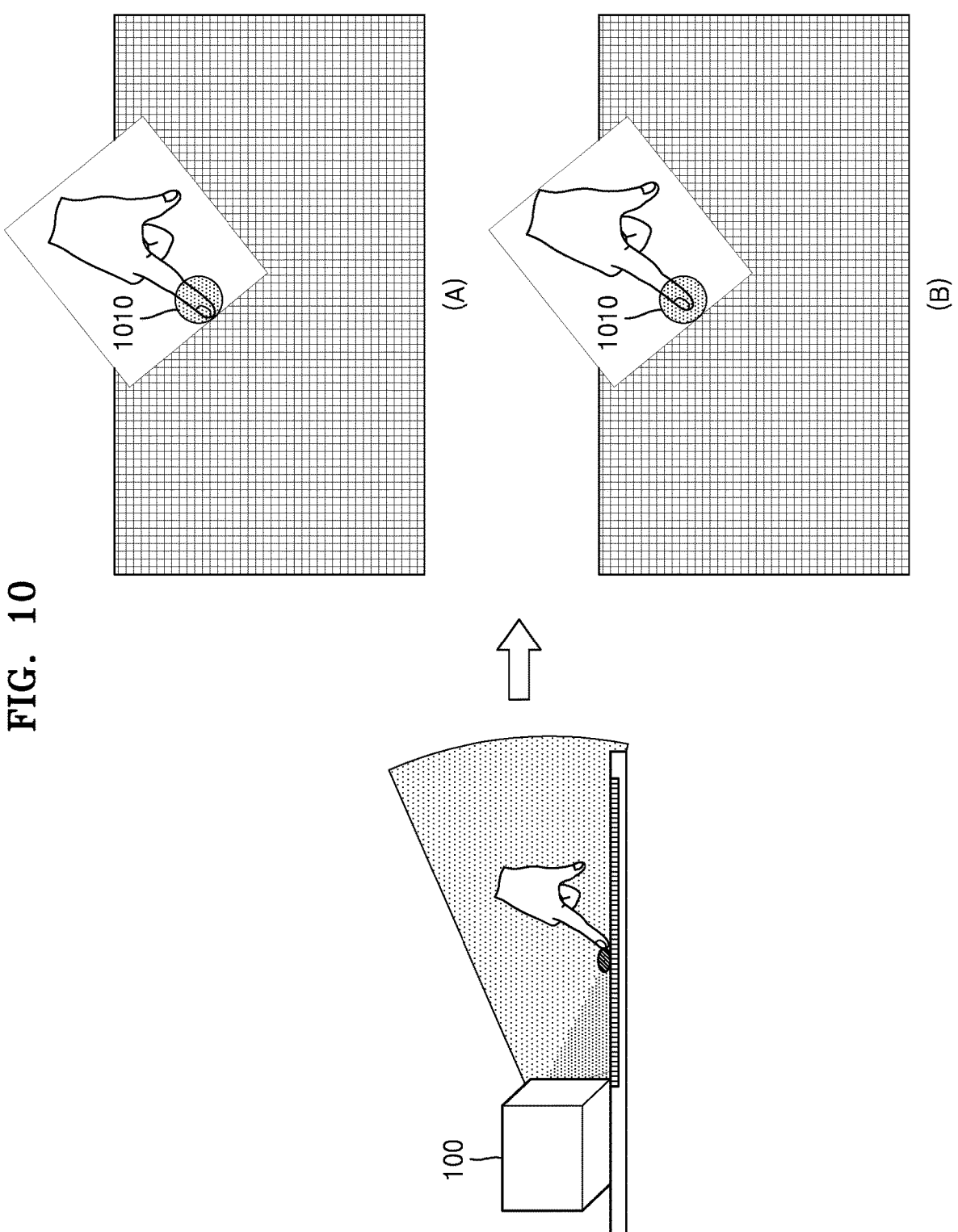
FIG. 10 illustrates a projector recognizing a touch input when a projection direction of the projector is toward a surface on which the projector is placed, according to an embodiment of the disclosure.

FIG. 10 illustrates a projector recognizing a touch input when a projection direction of the projector is toward a surface on which the projector is placed, according to an embodiment of the disclosure.

In an embodiment of the disclosure, when the detected projection direction is toward the surface on which the projector 100 is placed, the projector 100 may detect a direct touch input on the projection surface as in (A).

In an embodiment of the disclosure, the projector 100 may detect even a touch input in a space within a certain distance from the projection surface as a touch input on the projection surface as in (B) when the detected projection direction is toward the surface on which the projector 100 is placed. In other words, when a body part of the user or other input means approaches within a certain distance rather than a direct touch input on the projection surface, the projector 100 may detect that there is a touch input.

In an embodiment of the disclosure, when the detected projection direction is toward the surface on which the projector 100 is placed, the projector 100 may set a virtual plane 0.2 centimeters above the projection surface and based on this, detect a touch input.

In an embodiment of the disclosure, the projector 100 may set a size of a recognition point 1010 allowing touch recognition for a certain area and when there is a touch within the size of the recognition point 1010 from the certain area, detect it as a touch.

FIG. 11 illustrates possible screen changes of a projection surface when a projection direction of a projector is toward a surface on which the projector is placed, according to an embodiment of the disclosure.

When the projection direction of the projector 100 is toward the surface on which the projector 100 is placed, the projection screen may be distorted according to a condition of the surface, the projection surface or appearance of an obstacle.

In an embodiment of the disclosure, when the projection surface is completely flat and there is no obstacle, the projector 100 may output a projection screen in a rectangular shape 1110.

On the other hand, when there is a hindrance factor such as the projection surface tilting to one side, being bumpy or curved, or having a hole or an obstacle, the projector 100 may output a distorted projection screen as in a trapezoid form 1120 or 1130 or a rectangular form with some portions cut away 1140.

In an embodiment of the disclosure, when there is a hindrance factor on the projection surface as in 1120, 1130 and 1140, the projector 100 may vertically or horizontally adjust the image to look like a uniform rectangle from every side by performing the keystone correction to correctly display the image on the projection surface.

In an embodiment of the disclosure, the projector 100 may change an interpretation of a user input to suit the keystone correction. For example, after adjusting the size of the projection screen through the keystone correction, the projector 100 may adjust the sensing area for detecting touch inputs to suit the size of the adjusted projection screen. In this case, the projector 100 may detect a touch input made in the sensing area corresponding to the adjusted projection screen.

In an embodiment of the disclosure, the sensing area corresponding to the adjusted projection screen may be set during the manufacturing stage of the projector 100.

In an embodiment of the disclosure, the sensing area corresponding to the size of the adjusted projection screen may be matched to the adjusted projection screen one on one at the same location.

Figure 12:
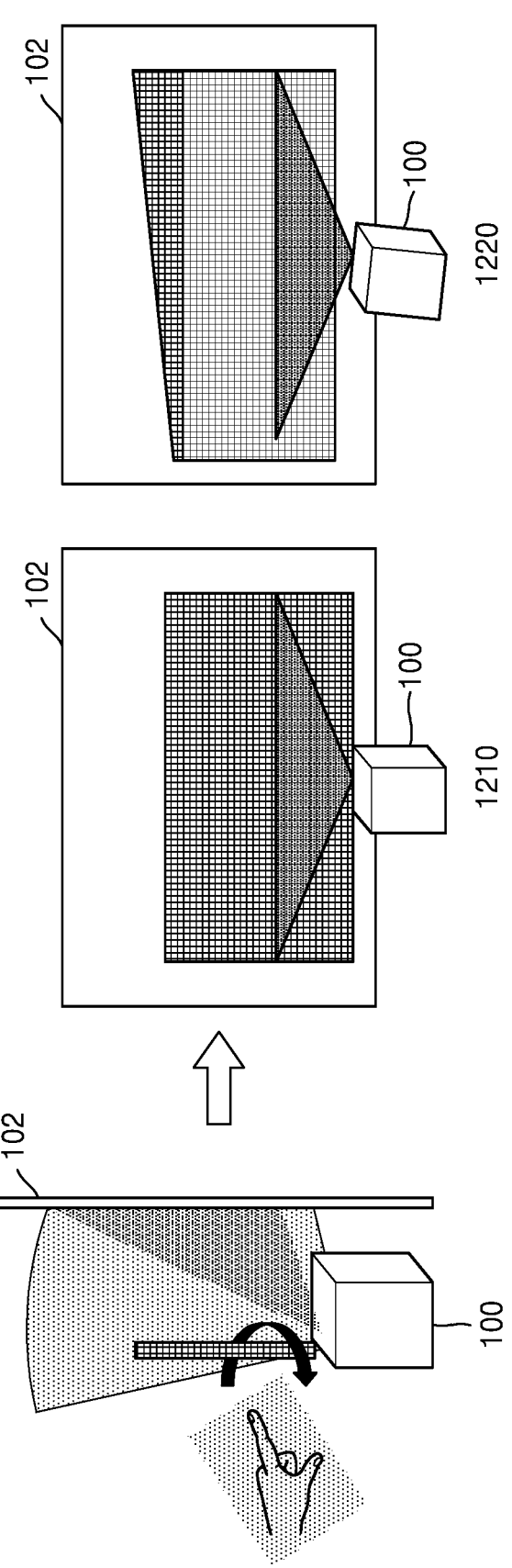
FIG. 12 illustrates possible screen changes of a projection surface when a projection direction of a projector is toward a surface perpendicular to a surface on which the projector is placed, according to an embodiment of the disclosure.

FIG. 12 illustrates possible screen changes of a projection surface when a projection direction of a projector is toward a surface perpendicular to a surface on which the projector is placed, according to an embodiment of the disclosure.

In an embodiment of the disclosure, when the projection direction is toward a surface perpendicular to the surface on which the projector 100 is placed, the projector 100 may output a projection screen of a rectangular shape as in 1210 when the projection part of the projector 100 is right in front of the projection surface.

On the other hand, when the projection direction is toward a surface perpendicular to the surface on which the projector 100 is placed and the projector 100 horizontally turns to the right, the projection part of the projector 100 fails to be right in front of the projection surface, so the projector 100 may output a projection screen of a trapezoid shape as in 1220.

In an embodiment of the disclosure, when the projection part of the projector 100 is not positioned right in front of the projection surface or there is a hindrance factor, the projector 100 may vertically or horizontally adjust the image to look like a uniform rectangle from every side by performing the keystone correction to correctly display the image on the projection surface.

In an embodiment of the disclosure, the projector 100 may change an interpretation of a user input to suit the keystone correction. For example, after adjusting the size of the projection screen through the keystone correction, the projector 100 may change an interpretation of a gesture input to suit the size and shape of the adjusted projection screen. This will be described in detail in connection with FIG. 13.

Figure 13:
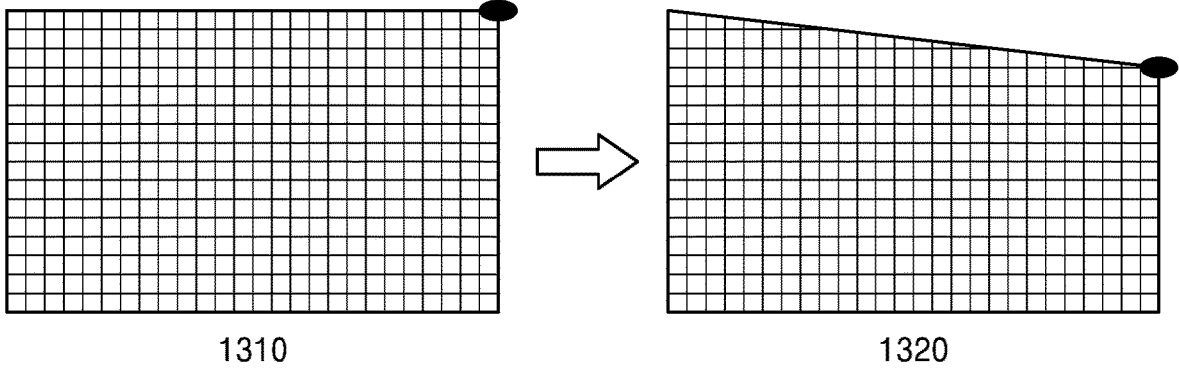
FIG. 13 illustrates an example of a change in a digital mirror device (DMD) active area corresponding to a possible screen change of a projection surface when a projection direction of a projector is toward a surface perpendicular to a surface on which the projector is placed, according to an embodiment of the disclosure.

FIG. 13 illustrates a change in DMD active area corresponding to a possible screen change of a projection surface when a projection direction of a projector is toward a surface perpendicular to a surface on which the projector is placed, according to an embodiment of the disclosure.

In a case that the projector 100 projects an image onto the projection surface from the front as in 1210 of the embodiment of the disclosure of FIG. 12, the projector 100 may obtain a DMD active area as in 1310.

In a case that the projector 100 projects an image onto the projection surface from a side as in 1220 of the embodiment of the disclosure of FIG. 12, the projector 100 may obtain a DMD active area as in 1320.

In an embodiment of the disclosure, in a case that the projector 100 shifts from a position for front projection as in 1210 of FIG. 12 to a position for side projection as in 1220 of FIG. 12, distortion of the projection screen occurs and the keystone correction performed accordingly may lead to reduction of one corner of the DMD active area as in 1320. Even in this case, however, the sensing area for detecting gestures may remain the same.

In an embodiment of the disclosure, when an operation corresponding to the detected gesture input is a movement of a pointer, the projector 100 may change an interpretation of the user input so that a traveled distance of the pointer on the projection screen is constant.

For example, the projector 100 may reduce the moving speed for a portion that has become short due to the distortion and increase the moving speed for a portion that has become long due to the distortion.

For example, a vertical side on the right of the DMD active area as in 1320 may correspond to the portion that has become short due to the distortion.

The projector 100 may make adjustment for the same user input to move the pointer as far as a certain distance by reducing the moving speed for the portion that has become short due to the distortion and increasing the moving speed for the portion that has become long due to the distortion, so that the pointer is moved a constant distance on both the normal projection screen as in 1210 of FIG. 12 and the distorted projection screen as in 1220 of FIG. 12.

The projector 100 may make the adjustment by changing an interpretation of the user input.

In an embodiment of the disclosure, when there is an obstacle, the projector 100 may perform a keystone correction that cuts out some portions. Also in this case, the projector 100 may reflect the change in screen caused by the correction in interpreting the user input by sharing the DMD active area that reflects the keystone correction.

As in an embodiment of the disclosure, the projector 100 may be fixed to the ceiling.

Figure 14:
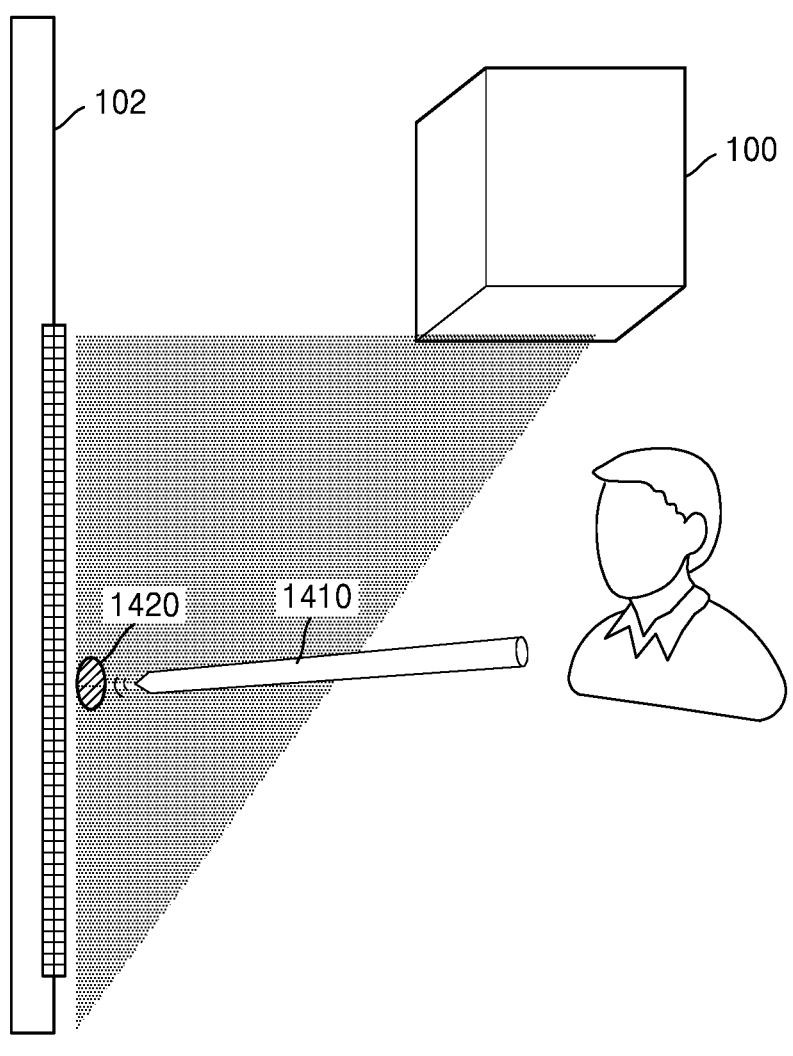
FIG. 14 illustrates an example of a projector projecting an image when a projection direction of the projector is toward a surface perpendicular to a ceiling to which the projector is fixed, according to an embodiment of the disclosure.

FIG. 14 illustrates a projector projecting an image when a projection direction of the projector is toward a surface perpendicular to a ceiling to which the projector is fixed, according to an embodiment of the disclosure.

When the projection direction of the projector 100 is toward a surface perpendicular to the ceiling to which the projector 100 is fixed, the projector 100 may use at least one sensor to detect a touch input of an input means that emits IR such as an IR pen 1410 on the projection surface 102 and recognize it as a user input.

As a pointing location 1420 may not be correctly detected when a signal of the IR emission from the input means is too intense, the projector 100 may use a filter algorithm to adjust the magnitude of the IR signal to be detected by the sensor to accurately detect the pointing location 1420 in an embodiment of the disclosure.

In an embodiment of the disclosure, the filter algorithm may be an algorithm to specify the most intense portion of the signal into the pointing location 1420 by applying a different weight to each portion of the IR signal.

The filter used in the filter algorithm may include a low-pass filter, a high-pass filter and a medium frequency filter for selecting particular frequency bands, and a Kalman filter related to signal intensity.

The method of controlling the projector 100 according to an embodiment of the disclosure may be implemented in the form of a computer-readable medium including instructions executable by a computer such as a program module to be executed by the computer. The computer-readable medium may be an arbitrary available medium that may be accessed by the computer, including volatile, non-volatile, removable, and non-removable mediums. The computer-readable media may include program instructions, data files, data structures, etc., separately or in combination. The program instructions recorded on the computer-readable media may be designed and configured specially for the disclosure, or may be well-known to those of ordinary skill in the art of computer software. Examples of the computer readable recording medium include magnetic media including hard disks, magnetic tapes, and floppy disks, optical media including compact disc read only memory (CD-ROM), and digital versatile discs (DVDs), magneto-optical media including floptical disks, and a hardware apparatus designed to store and execute the programmed commands in read-only memory (ROM), random-access memory (RAM), flash memories, and the like. Examples of the program instructions include not only machine language codes but also high-level language codes which are executable by a computer using an interpreter.

In an embodiment of the disclosure, the aforementioned method according to the various embodiments of the disclosure may be provided in a computer program product. The computer program product may be a commercial product that may be traded between a seller and a buyer. The computer program product may be distributed in the form of a storage medium (e.g., a CD-ROM), through an application store, directly between two user devices (e.g., smart phones), or online (e.g., downloaded or uploaded). In the case of online distribution, at least part of the computer program product (e.g., a downloadable app) may be at least temporarily stored or arbitrarily created in a storage medium that may be readable to a device such as a server of the manufacturer, a server of the application store, or a relay server.

Several embodiments of the disclosure have been described, but those of ordinary skill in the art will understand and appreciate that various modifications can be made without departing the scope of the disclosure. Thus, it will be apparent to those of ordinary skill in the art that the true scope of technical protection is only defined by the appended claims. Thus, it will be apparent that the disclosure is not limited to the embodiments as described above from every aspect. For example, an element described in the singular form may be implemented as being distributed, and elements described in a distributed form may be implemented as being combined.

According to an embodiment of the disclosure, a projector may include at least one sensor, a memory storing one or more instructions and at least one processor, the at least one processor configured to execute the one or more instructions stored in the memory to detect a projection direction of the projector by using the at least one sensor, detect a touch input on a projection surface by using the at least one sensor and recognize the touch input as a user input when the detected projection direction is toward a surface on which the projector is placed, use the at least one sensor to detect a gesture input of a user in a sensing area formed in an opposite direction of the projection surface based on the projector and recognize the gesture input as a user input when the detected projection direction is toward a surface perpendicular to the surface on which the projector is placed, and perform an operation corresponding to the recognized user input.

The at least one processor may be configured to execute the one or more instructions stored in the memory to perform keystone correction when the projection surface is crooked or there is an obstacle between a projection part of the projector which emits a projection beam and the projection surface, and change an interpretation of the user input to suit the keystone correction.

The at least one processor may be configured to execute the one or more instructions stored in the memory to detect whether keystone correction has been performed, and when detecting that the keystone correction has been performed, change the interpretation of the user input to suit a screen on which the keystone correction is completed.

The at least one processor may be configured to execute the one or more instructions stored in the memory to activate a user input reception enable mode when the detected projection direction is toward the surface on which the projector is placed and a distance between the projection part of the projector which outputs a projection beam and the projection surface corresponds to a certain distance or has a difference from the certain distance within a threshold.

The at least one processor may be configured to execute the one or more instructions stored in the memory to detect a touch input in a space within a certain distance from the projection surface as a touch input on the projection surface when the detected projection direction is toward the surface on which the projector is placed.

The at least one processor may be configured to execute the one or more instructions stored in the memory to, when the operation corresponding to the detected gesture input is a movement of a pointer, change an interpretation of the user input so that movement speed of the pointer is equal to speed before the keystone correction.

The at least one processor may be configured to execute the one or more instructions stored in the memory to, when receiving a certain user input, set the projector into a user input reception disable mode to prevent detection of touch inputs or gesture inputs of the user.

The at least one sensor may include at least one of a 3D-ToF sensor, a camera, a ToF camera, an IR camera, a depth camera, or a Lidar.

The at least one processor may be configured to execute the one or more instructions stored in the memory to detect a touch input of an IR pen on the projection surface by suing the at least one sensor and recognize the touch input as a user input, when the detected projection direction is toward a surface perpendicular to a ceiling to which the projector is fixed.

The at least one processor may be configured to execute the one or more instructions stored in the memory to recognize a location of the touch input of the IR pen by applying a certain algorithm to recognize the touch input of the IR pen on the projection surface.

According to an embodiment of the disclosure, a method of controlling a projector for receiving a user input may include detecting a projection direction of the projector by using at least one sensor, detecting a touch input on a projection surface by using the at least one sensor and recognizing the touch input as a user input when the detected projection direction is toward a surface on which the projector is placed, detecting a gesture input of a user in a sensing area formed in an opposite direction of the projection surface based on the projector by using the at least one sensor and recognizing the gesture input as a user input when the detected projection direction is toward a surface perpendicular to the surface on which the projector is placed, and performing an operation corresponding to the recognized user input.

The method may further include performing keystone correction when the projection surface is crooked or there is an obstacle between a projection part of the projector which emits a projection beam and the projection surface, and changing an interpretation of the user input to suit the keystone correction.

The method may further include detecting whether keystone correction has been performed and when detecting that the keystone correction has been performed, changing the interpretation of the user input to suit a screen on which the keystone correction is completed.

The method may further include activating a user input reception enable mode when the detected projection direction is toward the surface on which the projector is placed and a distance between a projection part of the projector which outputs a projection beam and the projection surface corresponds to a certain distance or has a difference from the certain distance within a threshold.

The method may further include detecting a touch input in a space within a certain distance from the projection surface as a touch input on the projection surface when the detected projection direction is toward the surface on which the projector is placed.

The method may further include, when the operation corresponding to the detected gesture input is a movement of a pointer, changing an interpretation of the user input so that movement speed of the pointer is equal to speed before the keystone correction.

The method may further include, when receiving a certain user input, setting the projector into a user input reception disable mode to prevent detection of touch inputs or gesture inputs of the user.

The at least one sensor may include at least one of a 3D-ToF sensor, a camera, a ToF camera, an IR camera, a depth camera, or a Lidar.

The method may further include detecting a touch input of an IR pen on the projection surface by using the at least one sensor and recognize the touch input as a user input, when the detected projection direction is toward a surface perpendicular to a ceiling to which the projector is fixed.

According to an embodiment of the disclosure, a computer-readable recording medium having recorded thereon a program to embody a method of controlling a projector for receiving a user input including detecting a projection direction of the projector by using at least one sensor, detecting a touch input on a projection surface by using the at least one sensor and recognize the touch input as a user input when the detected projection direction is toward a surface on which the projector is placed, detecting a gesture input of a user in a sensing area formed in an opposite direction of the projection surface based on the projector by using the at least one sensor and recognize the gesture input as a user input when the detected projection direction is toward a surface perpendicular to the surface on which the projector is placed, and performing an operation corresponding to the recognized user input.

The invention claimed is:

1. A projector comprising:
   a main body;
   at least one sensor;
   a memory storing one or more instructions; and
   at least one processor configured to execute the one or more instructions stored in the memory to:
       detect a projection direction of the projector using the at least one sensor,
       when the detected projection direction is toward a surface on which the projector is placed,
           form a first sensing area in the detected projection direction,
           detect, in the first sensing area, a touch input on a projection surface, to which the projector projects an image, using the at least one sensor,
           recognize the touch input as a user input, and
           perform an operation corresponding to the touch input recognized as the user input, and
       when the detected projection direction is toward a surface perpendicular to the surface on which the projector is placed,
           form a second sensing area in a direction opposite to the detected projection direction with respect to the projector,
           detect a gesture input of a user in the second sensing area, using the at least one sensor,
           recognize the gesture input as a user input, and
           perform an operation corresponding to the gesture input recognized as the user input,
       wherein the at least one sensor used to detect the touch input in the first sensing area is used to detect the gesture input in the second sensing area, and the at least one sensor performs motion detection from a same side of the main body to detect the touch input in the first sensing area and the gesture input in the second sensing area.

2. The projector of claim 1, wherein the at least one processor is configured to execute the one or more instructions stored in the memory to:

perform keystone correction when the projection surface is crooked or an obstacle is between a projection part of the projector to emit a projection beam and the projection surface, the keystone correction including change an interpretation of the user input to correspond to the keystone correction.

3. The projector of claim 1, wherein the at least one processor is configured to execute the one or more instructions stored in the memory to:

detect whether keystone correction has been performed, and when it is detected that the keystone correction has been performed, change an interpretation of the user input to correspond to a screen on which the keystone correction is completed.

4. The projector of claim 1, wherein the at least one processor is configured to execute the one or more instructions stored in the memory to:

when the detected projection direction is toward the surface on which the projector is placed, and a distance between a projection part of the projector and the projection surface is within a certain distance, set the projector in a user input reception enable mode wherein the projection part outputs a projection beam.

5. The projector of claim 1, wherein the at least one processor is configured to execute the one or more instructions stored in the memory to:

when the detected projection direction is toward the surface on which the projector is placed, detect a touch input in a space within a certain distance from the projection surface as a touch input on the projection surface.

6. The projector of claim 2, wherein the at least one processor is configured to execute the one or more instructions stored in the memory to:

when the operation corresponding to the gesture input recognized as the user input is movement of a pointer, change an interpretation of the user input so that a traveled distance of the pointer corresponding to the gesture input recognized as the user input is equal to a traveled distance before the keystone correction.

7. The projector of claim 1, wherein the at least one processor is configured to execute the one or more instructions stored in the memory to:

when receiving a preset user input, set the projector to a user input reception disable mode to prevent detection of the touch input or the gesture input of the user.

8. The projector of claim 1, wherein the at least one sensor includes at least one of a three-dimensional (3D) time of flight (ToF) sensor, a camera, a ToF camera, an infrared (IR) camera, a depth camera, and a Lidar.

9. The projector of claim 1, wherein the at least one processor is configured to execute the one or more instructions stored in the memory to:

when the detected projection direction is toward a surface perpendicular to a ceiling to which the projector is fixed, detect a touch input of an infrared (IR) pen on the projection surface using the at least one sensor, recognize the touch input of the IR pen as a user input, and perform an operation corresponding to the touch input of the IR pen recognized as the user input.

10. The projector of claim 9, wherein the at least one processor is configured to execute the one or more instructions stored in the memory to:

recognize a location of the touch input of the IR pen by applying a certain algorithm to recognize the touch input of the IR pen on the projection surface.

11. A method of controlling a projector that includes a main body and at least one sensor, the method comprising, by the projector:

detecting a projection direction of the projector using the at least one sensor;

when the detected projection direction is toward a surface on which the projector is placed, forming a first sensing area in the detected projection direction, detecting, in the first sensing area, a touch input on a projection surface, to which the projector projects an image, using the at least one sensor, recognizing the touch input as a user input, and performing an operation corresponding to the touch input recognized as the user input; and when the detected projection direction is toward a surface perpendicular to the surface on which the projector is placed, form a second sensing area in a direction opposite to the detected projection direction with respect to the projector, detecting a gesture input of a user in the second sensing area, using the at least one sensor, recognizing the gesture input as a user input, and performing an operation corresponding to the gesture input recognized as the user input, wherein the at least one sensor used to detect the touch input in the first sensing area is used to detect the gesture input in the second sensing area, and the at least one sensor performs motion detection from a same side of the main body to detect the touch input in the first sensing area and the gesture input in the second sensing area.

12. The method of claim 11, further comprising, by the projector:

performing keystone correction when the projection surface is crooked or an obstacle is between a projection part of the projector and the projection surface, wherein the projection part emits a projection beam, and changing an interpretation of the user input to correspond to the keystone correction.

13. The method of claim 11, further comprising, by the projector:

detecting whether keystone correction has been performed; and when it is detected that the keystone correction has been performed, changing an interpretation of the user input to correspond to a screen on which the keystone correction is completed.

14. The method of claim 11, further comprising, by the projector:

when the detected projection direction is toward the surface on which the projector is placed, and a distance between a projection part of the projector and the projection surface is within a certain distance, setting the projector to a user input reception enable mode wherein the projection part outputs a projection beam.

15. The method of claim 11, further comprising, by the projector:

when the detected projection direction is toward the surface on which the projector is placed, detecting a touch input in a space within a certain distance from the projection surface as a touch input on the projection surface.

16. The method of claim 12, further comprising, by the projector:

when the operation corresponding to the gesture input recognized as the user input is movement of a pointer, changing an interpretation of the user input so that a traveled distance of the pointer corresponding to the gesture input recognized as the user input is equal to a traveled distance before the keystone correction.

17. The method of claim 11, further comprising, by the projector:

when a preset user input is received, setting the projector to a user input reception disable mode to prevent detection of the touch input or the gesture input of the user.

18. The method of claim 11, wherein the at least one sensor includes at least one of a three-dimensional (3D) time of flight (ToF) sensor, a camera, a ToF camera, an infrared (IR) camera, a depth camera, or a Lidar.

19. The method of claim 11, further comprising, by the projector:

when the detected projection direction is toward a surface perpendicular to a ceiling to which the projector is fixed, detecting a touch input of an infrared (IR) pen on the projection surface using the at least one sensor, recognizing the touch input of the IR pen as a user input, and performing an operation corresponding to the touch input of the IR pen recognized as the user input.

20. A non-transitory computer-readable recording medium having recorded thereon a program for carrying out the method of claim 11 on a computer.

* * * * *